United States Patent
Maruyama et al.

(10) Patent No.: US 6,705,648 B1
(45) Date of Patent: Mar. 16, 2004

(54) PIPE JOINT

(75) Inventors: Kazushi Maruyama, Kitakyushu (JP); Eiji Tsuru, Futtsu (JP); Haruyuki Nagayoshi, Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/355,704

(22) PCT Filed: Dec. 2, 1998

(86) PCT No.: PCT/JP98/05445

§ 371 (c)(1),
(2), (4) Date: Aug. 3, 1999

(87) PCT Pub. No.: WO99/28665

PCT Pub. Date: Jun. 10, 1999

(30) Foreign Application Priority Data

| Dec. 4, 1997 | (JP) | ................ | 9-352174 |
| Jan. 8, 1998 | (JP) | ................ | 10-015046 |
| Nov. 12, 1998 | (JP) | ................ | 10-322170 |

(51) Int. Cl.[7] ............................... F16L 25/00
(52) U.S. Cl. ............... 285/334; 285/333; 285/355; 285/390; 285/92
(58) Field of Search ................. 285/333, 334, 285/355, 390, 92

(56) References Cited

U.S. PATENT DOCUMENTS

| 2,206,166 | A | * | 7/1940 | Dunn | 285/148.7 |
| 2,893,759 | A | * | 7/1959 | Blose | 285/334 |
| 3,224,799 | A | * | 12/1965 | Blose et al. | 285/334 |
| 4,444,421 | A | * | 4/1984 | Ahlstone | 285/86 |
| 4,600,225 | A | * | 7/1986 | Blose | 285/334 |
| 4,717,183 | A | * | 1/1988 | Nobileau | 285/334 |
| 4,786,090 | A | * | 11/1988 | Mott | 285/332.3 |
| 4,830,411 | A | * | 5/1989 | Tsuru et al. | 285/334 |
| 4,865,364 | A | * | 9/1989 | Nobileau | 285/334 |
| 5,092,635 | A | * | 3/1992 | DeLange et al. | 285/334 |
| 5,360,240 | A | * | 11/1994 | Mott | 285/95 |
| 5,782,503 | A | * | 7/1998 | Noel et al. | 285/94 |
| 5,788,401 | A | * | 8/1998 | Drenth | 403/343 |
| 5,931,511 | A | * | 8/1999 | DeLange et al. | 285/334 |

FOREIGN PATENT DOCUMENTS

| JP | 49-51621 | 5/1974 |
| JP | 50-129401 | 10/1975 |
| JP | 59-170591 | 9/1984 |
| JP | 07-504483 | 5/1995 |

* cited by examiner

Primary Examiner—J. J. Swann
Assistant Examiner—Carlos Lugo
(74) Attorney, Agent, or Firm—Kenyon & Kenyon

(57) ABSTRACT

A pipe joint comprising: a pin having a tapered male screw section formed on an outer circumferential face of an end of a pipe; a box having a tapered female screw section, which can be screwed to the tapered male screw section, formed on an inner circumferential face of an end of a pipe, wherein the tapered male screw section is screwed into the tapered female screw section, a top face of a male thread ridge of the tapered male screw section and a top face of a female thread ridge of the tapered female screw section have a predetermined width like a square screw thread, trapezoidal screw thread and buttress screw thread, and top faces of both thread ridges are inclined in a direction opposite to a tapered face of screw threads with respect to a face parallel to the pipe axis.

8 Claims, 24 Drawing Sheets

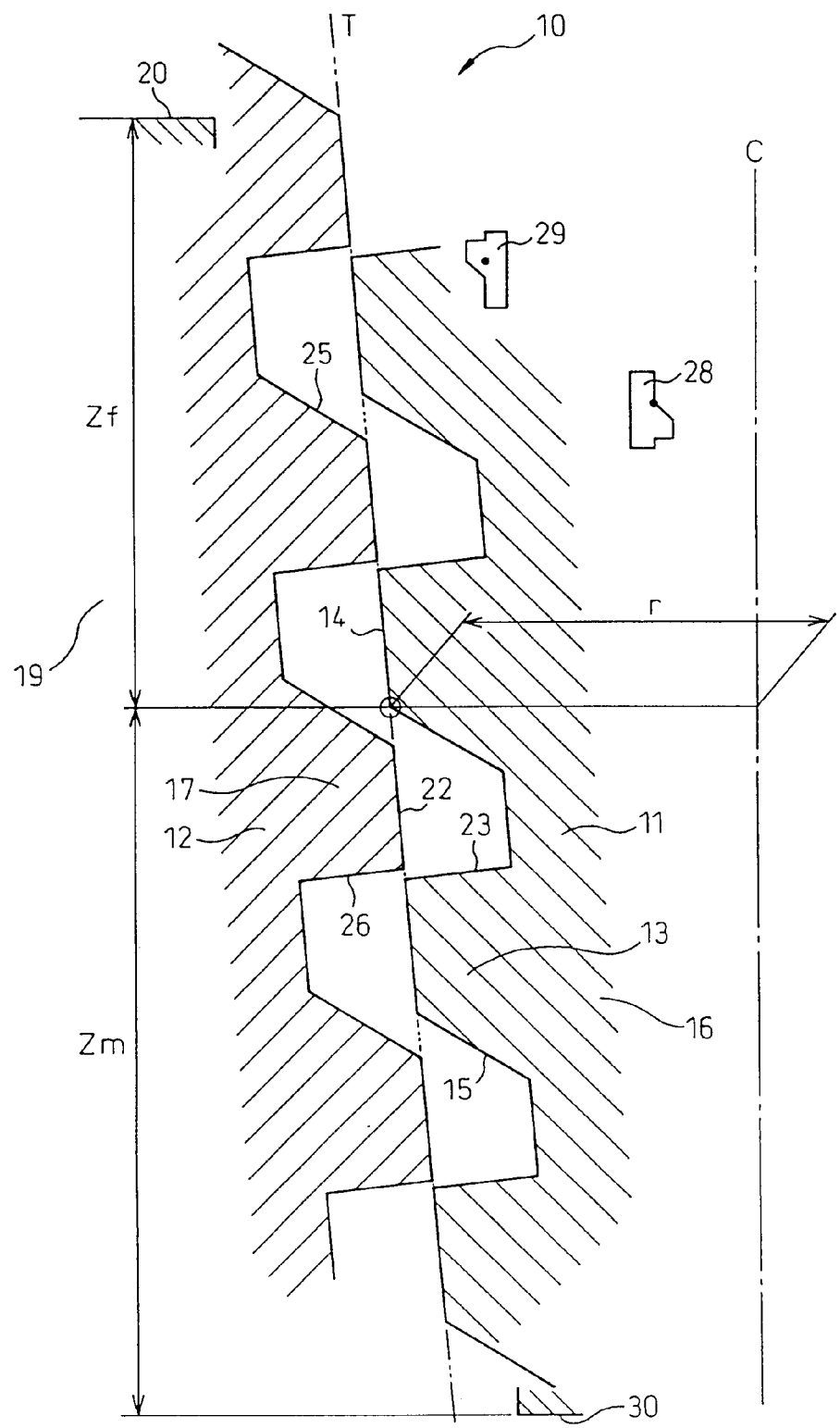

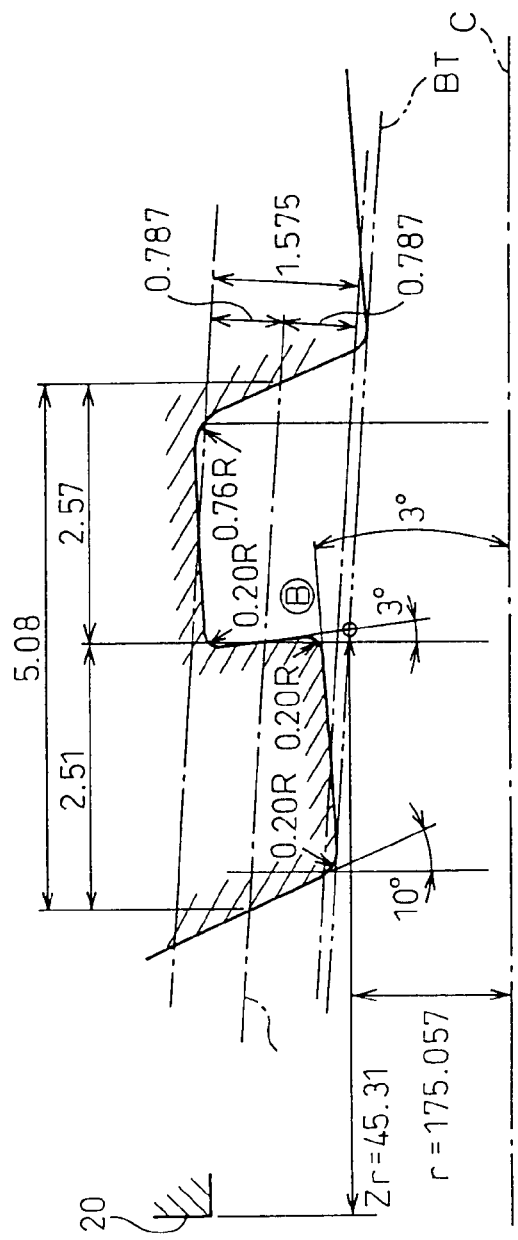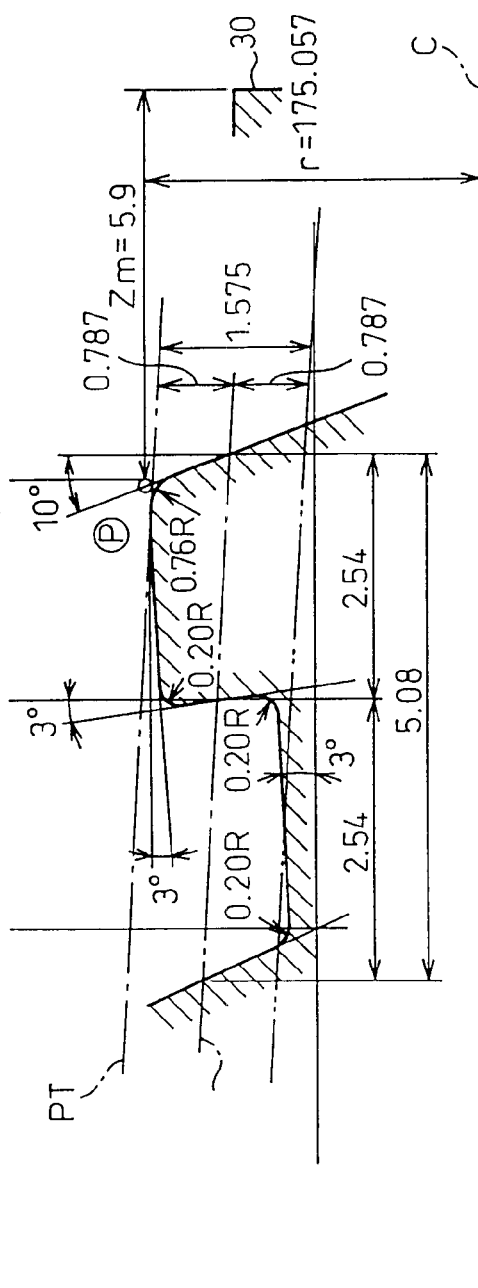
Fig.8(B)
Fig.8(C)

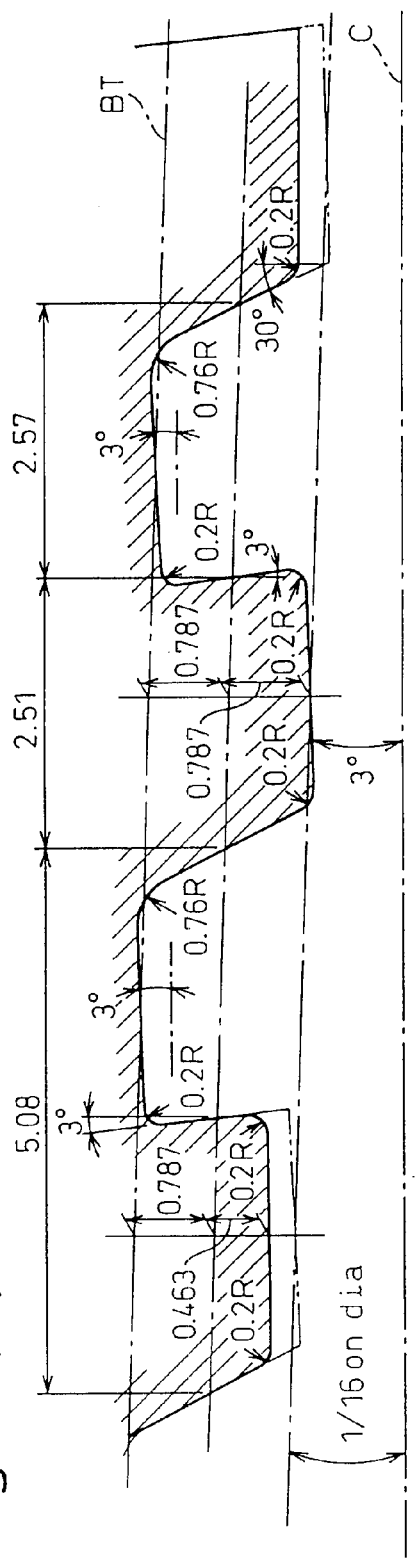

PIPE JOINT

FIELD OF THE INVENTION

The present invention relates to a pipe joint capable of enhancing a working property when a tapered male screw section of a pin is perpendicularly inserted into a tapered female screw section of a box or coupling and successively turned so that the male screw section can be screwed into the female screw section.

DESCRIPTION OF THE PRIOR ART

Conventionally, as a pipe joint used for an oil well pipe, a pipe pile for construction work and so forth, there is provided a joint composed of a tapered square thread for pipe use including a trapezoidal screw thread and buttress screw thread in which a tapered male screw section 52 of a pin 51 of a pipe 50 is engaged with a tapered female screw section 55 of a box 54 of a short pipe 53 as shown in FIGS. 9(A) and 9(B). FIG. 9(B) is an enlarged view showing a state of starting the engagement of this tapered square screw joint for pipe use.

In order to clearly explain the stabbing property (a performance of the connection can be made up immediately after stabbing) of the tapered square screw joint, a profile of a male thread ridge 56 of the tapered male screw section 52 is made to be the same as that of a female thread ridge 57 of the tapered female screw section 55, and a top face 58 of the ridge of the male screw and a top face 59 of the ridge of the female screw are made to be parallel to tapered face $T_f$. FIG. 9(B) is a cross-sectional view showing a state of engagement of the ridge of the male screw 56 with the ridge of the female screw 57 which are going to engage with each other. That is, a tapered face, on which top faces 58 of the ridges of the male screw- section 52 are continuously arranged, and a tapered face, on which top faces 59 of the ridges of the female screw section 55 are continuously arranged, precisely coincide with each other. In this drawing, a position of the tapered male screw section 52 in the circumferential direction is set at a position of the tapered female screw section 55 in the circumferential direction so that the ridges 56 of the male screw section can be located at bottoms 60 of the ridges 57 of the female screw section. As can be clearly seen in the drawing, it is impossible to screw the tapered male screw section 52 into the tapered female screw section 55 in the above state.

Referring to FIG. 10(B) showing a buttress screw joint of API, which is commonly used as an oil well pipe screw, the stabbing property of a square screw joint for pipe use will be explained below. In this case, explanations will be made into a mechanism in which a male thread ridge 63 and a female thread ridge 64 are screwed into bottoms of the threads after the tapered male screw section 61 has been inserted into the tapered female screw section 62.

Elements of the buttress screw of API are described as follows. Taper $T=\frac{1}{16}$ (or 62.5 mm/m). This taper is a ratio of change in the diameter. Pitch P=5.08 mm. Height of the ridge H=1.575 mm. Stabbing flank angle $\eta=10°$. Load flank angle $\gamma=3°$. Straight line sections of the top faces 65, 66 of the ridges of the male and the female screw are parallel to tapered face $T_p$ (pitch line). Corner R of the top face 65 of the male screw is 0.76 mm and corner R of the top face 66 of the female screw is 0.2 mm.

FIG. 10(A) is a view showing a state in which the tapered male screw section 61 is fitted into the tapered female screw section 62 in the most appropriate circumferential direction. Different from the above case into which the tapered square screw joint for pipe use is incorporated, an opening section 68 of a bottom 67 of the tapered female screw section 62 is larger than the top face 65 of the ridge 63 of the male screw, and when R is formed at the corner, the difference can be further increased. When the tapered male screw section 61 is perpendicularly dropped in the above condition, a corner section 69 of the male ridge 63 of the tapered male screw section 61 can be slightly mounted on a corner section 70 of the ridge 64 of the tapered female screw section 62. When the tapered male screw section 61 is turned in the above state, the tapered males crew section 61 is spirally fitted into the tapered female screw section 62.

In order to fit the tapered male screw section 61 into the tapered female screw section 62, relative positions of the male and the female screw line are not necessarily limited to the positions shown in FIG. 10(A). The tapered male screw section 61 can be fitted into the tapered female screw section 62 even at apposition at which the tapered female screw section 61 is shifted downward from the position shown in FIG. 10(A) so that corner R of the stabbing flank face 71 of the ridge 63 of the male screw section comes into contact with corner R of the stabbing flank face 72 of the tapered female screw section 62. When the tapered male screw section 61 is screwed into the tapered female screw section 62 by an angle in the circumferential direction corresponding to this shift, an allowance can be provided in the circumferential direction so that the tapered male screw section 61 can be properly screwed into the tapered female screw section 62.

In normal inserting and screwing work, the tapered male screw section 61 is inserted into the tapered female screw section 62, and then the tapered male screw section 61 is turned to the above circumferential position at which the ridge 63 of the tapered male screw section 61 can be properly mounted on the ridge 64 of the tapered female screw section 62. Since the ridge 63 of the male screw section has not been engaged yet with the ridge 64 of the female screw section at this time, there is a possibility that gall occurs unless the axis of the tapered male screw section 61 agrees with the axis of the tapered female screw section 62. In the case of a conductor casing, the diameter of which is large, since the rotational angle is large, it is difficult to search for the screwing position. Accordingly, when a range is large, in which the circumferential position at which the ridge 63 of the male screw section is screwed to the ridge 64 of the female screw section, it possible to reduce a rotational angle necessary for turning the male screw section to an appropriate position, that is, the stabbing property of the tapered screw joint is high. When clearance G between width W of the opening section 68 of the bottom 67 of the tapered female screw section 62 and width V of the top face 65 of the ridge of the tapered male section is large, another advantage can be provided as follows. When the tapered male screw section 61 is dropped by an amount corresponding to clearance G so that the tapered male screw section 61 is mounted on the stabbing flank face 72 of the ridge 64 of the tapered female screw section 62, it is possible to ensure a distance (clearance G in the axial direction of the pipe ×taper T)/2 for mounting the tapered male screw section 61 on the stabbing flank face 72 of the ridge 64 of the tapered female screw section 62 in the radial direction. Therefore, it is possible to screw the tapered male screw section into the tapered female screw section stably.

As can be understood by the above explanations, the stabbing property, which is defined as a performance by which the tapered male screw section can be smoothly screwed into the tapered female screw section after the tapered male screw section has been inserted into the tapered female screw section, is enhanced when a circumferential range (θ) in which screwing can be started at a position as it is when the tapered male screw section 61 is inserted into the tapered female screw section 62, and also the stabbing property is enhanced when a depth δ, by which the stabbing flank face 71 of the male thread ridge 63 is mounted on the stabbing flank face 72 of the female thread ridge 64, is large, wherein the depth δ is the same as the distance in which the tapered male screw section 61 is mounted on the stabbing flank face 72 of the female ridge 64. Angle θ and depth δ, which control the stabbing property, will be explained referring to some examples of the conventional tapered screw joint.

First, a buttress joint of API will be explained below. As shown in FIG. 10(B), first, an angle of the stabbing flank 71 of the ridge 63 of the tapered male screw section 61, that is, a stabbing flank angle η is inclined by the angle of 10° with respect to a face perpendicular to pipe axis C. The larger the inclination of the stabbing flank angle η is, the larger the clearance G of engagement becomes. Secondly, R=0.76 mm is provided in the corner 69 of the stabbing flank face 71 of the ridge 63 of the tapered male screw section 61, and clearance G is further extended. Furthermore, when the tapered male screw section 61 is a little more slender than the tapered female screw section 62, that is, when the tapered male screw section 61 is more slender than that of the tapered female screw section 62 by 0.03 mm in a direction of the screw axis, and when R is provided in the corners 75, 76 formed by the top faces 65, 66 of the ridges of the male and the female screw sections and the load flank faces 73, 74, the clearance G can be further extended. In FIG. 10(B), R=0.20 mm. Due to the foregoing, clearance G is a little extended. In this case, a total of all clearances is approximately estimated to be 1.75 mm. When this value is converted into a range (θ) in the circumferential direction, θ=(360°×1.75)/5.08=124°. On the other hand, depth (δ) is determined by δ=1.75/32=0.055 mm.

Next, a Seal-Lock Joint manufactured by Aramco Co. will be explained below. In this special joint, first, the stabbing flank angle η on the insertion side is inclined by 45° with respect to a face perpendicular to the pipe axis. Secondly, top faces of the male and the female screw section are made to be parallel to the pipe axis. Therefore, when the tapered male screw section is inserted into the tapered female screw section, it is difficult for the male ridge and the female ridge to be stuck with each other.

Further, in a special joint manufactured by Vetco-Gray Co., when a fourfold-start screw thread is applied, there are provided four screwing positions in one round of 360°. Therefore, after the tapered male screw section has been inserted into the tapered female screw section, screwing can be accomplished by turning the screw section only a little. In this connection, in the case of a normal single-start screw thread, the number of screwing sections is one.

The most remarkable characteristic of a multiples-start screw threads, the number of threads of which is "n", is that the number of rotations necessary for screwing is 1/n compared with the single-start screw thread. This is a very important factor in the case of a joint of large diameter which is tightened by a rope and the like.

There is provided another special joint in which an entrance of the tapered female screw section is formed long, that is, a stabbing guide is arranged at the entrance, so that the tapered male screw section can be straight inserted into the tapered female screw section.

However, the above conventional pipe joints have the following problems to be solved.

In the case of a single-start screw thread, the inserting position does not necessarily agree with the starting position of screwing. Therefore, in order to search the screwing position, it is necessary to turn the tapered female screw section.

On the other hand, in the case of a multiple-start screw thread including a fourfold-start screw thread, there are provided a plurality of screwing positions, the number of which is the same as the number of threads. Therefore, the number of turns can be reduced in the process of adjustment. Due to the foregoing, the stabbing property can be considerably improved compared with a single-start screw thread. Even when the stabbing property is considerably improved, it is impossible to immediately start inserting the tapered male screw section into the tapered female screw section.

In the case of a pipe joint having a stabbing guide, it is possible to prevent the occurrence of problems such as gall which is caused when the screw is obliquely inserted, however, it is impossible to start screwing immediately after the insertion.

SUMMARY OF THE INVENTION

The present invention has been achieved in view of the above circumstances. It is an object of the present invention to provide a pipe joint capable of being screwed quickly and easily from a position at which a tapered male screw section having a single or multiple-start screw thread is inserted into a tapered female screw section.

The first invention of the present invention to accomplish the above object provides a pipe joint comprising: a pin having a tapered male screw section formed on an outer circumferential face of an end of a pipe; a box having a tapered female screw section, which can be screwed to the tapered male screw section, formed on an inner circumferential face of an end of a pipe, wherein the tapered male screw section is screwed into the tapered female screw section, a top face of a male thread ridge of the tapered male screw section and a top face of a female thread ridge of the tapered female screw section have a predetermined width like a square screw thread, trapezoidal screw thread and buttress screw thread, and top faces of both thread ridges are inclined in a direction opposite to a tapered face of screw threads with respect to a face parallel to the pipe axis.

The second invention provides a pipe joint comprising: a pin having a tapered male screw section formed on an outer circumferential face of an end of a pipe; a coupling having tapered female screw sections, which can be screwed to the tapered male screw section, formed on inner circumferential faces of both ends of a short pipe, wherein the tapered male screw section is screwed into the tapered female screw section, a top face of a male thread ridge of the tapered male screw section and a top face of a female thread ridge of the tapered female screw section have a predetermined width like a square screw thread, trapezoidal screw thread and buttress screw thread, and top faces of both thread ridges are inclined in a direction opposite to a tapered face of screw threads with respect to a face parallel to the pipe axis.

The third invention provides a pipe joint comprising: a pin having a tapered male screw section formed on an outer circumferential face of an end of a pipe; a box having a tapered female screw section, which can be screwed to the tapered male screw section, formed on an inner circumferential face of an end of a pipe, wherein the tapered male screw section is screwed into the tapered female screw section, a top face of a male thread ridge of the tapered male screw section and a top face of a female thread ridge of the tapered female screw section have a predetermined width like a square screw thread, trapezoidal screw thread and buttress screw thread, portions of top faces of both thread ridges are inclined in a direction opposite to a tapered face of a screw thread with respect to a face parallel to the pipe axis, and the rest of top faces of both thread ridges are made parallel to the pipe axis.

The fourth invention provides a pipe joint comprising: a pin having a tapered male screw section formed on an outer circumferential face of an end of a pipe; a coupling having tapered female screw sections, which can be screwed to the tapered male screw section, formed on inner circumferential faces of both ends of a short pipe, wherein the tapered male screw section is screwed into the tapered female screw section, a top face of a male thread ridge of the tapered male screw section and a top face of a female thread ridge of the tapered female screw section have a predetermined width like a square screw thread, trapezoidal screw thread and buttress screw thread, portions of top faces of both thread ridges are inclined in a direction opposite to a tapered face of screw threads with respect to a face parallel to the pipe axis, and the rest of top faces of both thread ridges are made parallel to the pipe axis.

The fifth invention provides a pipe joint comprising: a pin having a tapered male screw section formed on an outer circumferential face of an end of a pipe; a box having a tapered female screw section, which can be screwed to the tapered male screw section, formed on an inner circumferential face of an end of a pipe, wherein a multiple-start screw thread is applied, in the case of an odd screw thread, a row of threads is composed of high male and female thread ridges, which are arranged every thread ridges, the number of which is (number of thread ridges—1), and also composed of low male and female thread ridges arranged between the high male and female thread ridges, in the case of an even screw thread, a row of screw threads is composed of high male and female thread ridges and low male and female thread ridges which are alternately arranged, or a row of threads is composed of high male and female thread ridges, which are arranged every thread ridges, the number of which is (number of thread ridges—1), and also composed of low male and female thread ridges arranged between the high male and female thread ridges.

The sixth invention provides a pipe joint comprising: a pin having a tapered male screw section formed on an outer circumferential face of an end of a pipe; a coupling having tapered female screw sections, which can be screwed to the tapered male screw section, formed on inner circumferential faces of both ends of a short pipe, wherein a multiple-start screw thread is applied, in the case of an odd screw thread, a row of threads is composed of high male and female thread ridges, which are arranged every thread ridges, the number of which is (number of thread ridges—1), and also composed of low male and female thread ridges arranged between the high male and female thread ridges, in the case of an even screw thread, a row of screw threads is composed of high male and female thread ridges and low male and female thread ridges which are alternately arranged, or a row of threads is composed of high male and female thread ridges, which are arranged every thread ridges, the number of which is (number of thread ridges—1), and also composed of low male and female thread ridges arranged between the high male and female thread ridges.

The seventh invention provides a pipe joint wherein a top face of a male thread ridge of the male screw section and a top face of a female thread ridge of the female screw section have a predetermined width like a square screw thread, trapezoidal screw thread and buttress screw thread, and top faces of both thread ridges are inclined in a direction opposite to a tapered face of screw thread with respect to a face parallel to the pipe axis.

The eighth invention provides a pipe joint wherein a top face of a male thread ridge of the male screw section and a top face of a female thread ridge of the female screw section have a predetermined width like a square screw thread, trapezoidal screw thread and buttress'screw thread, and top faces of both thread ridges are inclined in a direction opposite to a tapered face of screw threads with respect to a face parallel to the pipe axis.

The ninth invention provides a pipe joint comprising: a pin having a tapered male screw section formed on an outer circumferential face of an end of a pipe; a box having a tapered female screw section, which can be screwed to the tapered male screw section, formed on an inner circumferential face of an end of a pipe, wherein marks to make the tapered male screw section agree with the tapered female screw section in the circumferential direction are attached in the process of thread cutting so that an original positional relation between the male thread row and the female thread row can be reproduced in which the stabbing flank face of the male thread ridge is set on the stabbing flank face of the female thread ridge without the occurrence of sticking between the top face of the thread ridge of the male screw section and the top face of the thread ridge of the female screw section when the tapered male screw section is lowered in a perpendicular direction under the condition that a virtual tapered face coming into contact with the top face of the thread ridge of the tapered male screw section and a virtual tapered face coming into contact with the top face of the thread ridge of the tapered female screw section, agree with each other when the tapered male screw section is inserted into the tapered female screw section.

The tenth invention provides a pipe joint comprising: a pin having a tapered male screw section formed on an outer circumferential face of an end of a pipe; a coupling having tapered female screw sections, which can be screwed to the tapered male screw section, formed on inner circumferential faces of both ends of a short pipe, wherein marks to make the tapered male screw section agree with the tapered female screw section in the circumferential direction are attached in the process of thread cutting so that an original positional relation between the male thread row and the female thread row can be reproduced in which the stabbing flank face of the male thread ridge is set on the stabbing flank face of the female thread ridge without the occurrence of competition between the top face of the thread ridge of the male screw section and the top face of the thread ridge of the female screw section when the tapered male screw section is lowered in a perpendicular direction under the condition that a virtual tapered face coming into contact with the top face of the thread ridge of the tapered male screw section and a virtual tapered face coming into contact with the top face of the thread ridge of the tapered female screw section, agree with each other when the tapered male screw section is inserted into the tapered female screw section.

BRIEF DESCRIPTION OF THE DRAWINGS

FIG. 1(A) is a cross-sectional view for explaining a proper range of insertion of a tapered screw joint which is an embodiment of the present invention.

FIGS. 8(A), 8(B) and 8(C) are views showing the detail of the size of the pipe joint.

FIGS. 11(A) and 11(B) are views showing the detail of the size of the screw joint.

THE MOST PREFERRED EMBODIMENT

The present invention has been achieved according to the following concepts.

Concerning the form of insertion in which a tapered male screw section is inserted into a tapered female screw section, the following three forms are provided. The first form is that a male and a female thread ridge compete with each other. The second form is that a male and a female thread ridge partially compete with each other. The third form is that a top face of a thread ridge of a tapered male screw section is put on a bottom of a thread ridge of a tapered female screw section, and successively a side (stabbing flank face) of the thread ridge of the tapered male screw section lands at a side (stabbing flank face) of the thread ridge of the female screw section.

In order to make it possible to screw a tapered male screw section into a tapered female screw section immediately after the tapered male screw section has been inserted into the tapered female screw section, the present invention adopts the following three elemental techniques in which the above third state can always be realized when the tapered male screw section is inserted into the tapered female screw section.

Figure 3:
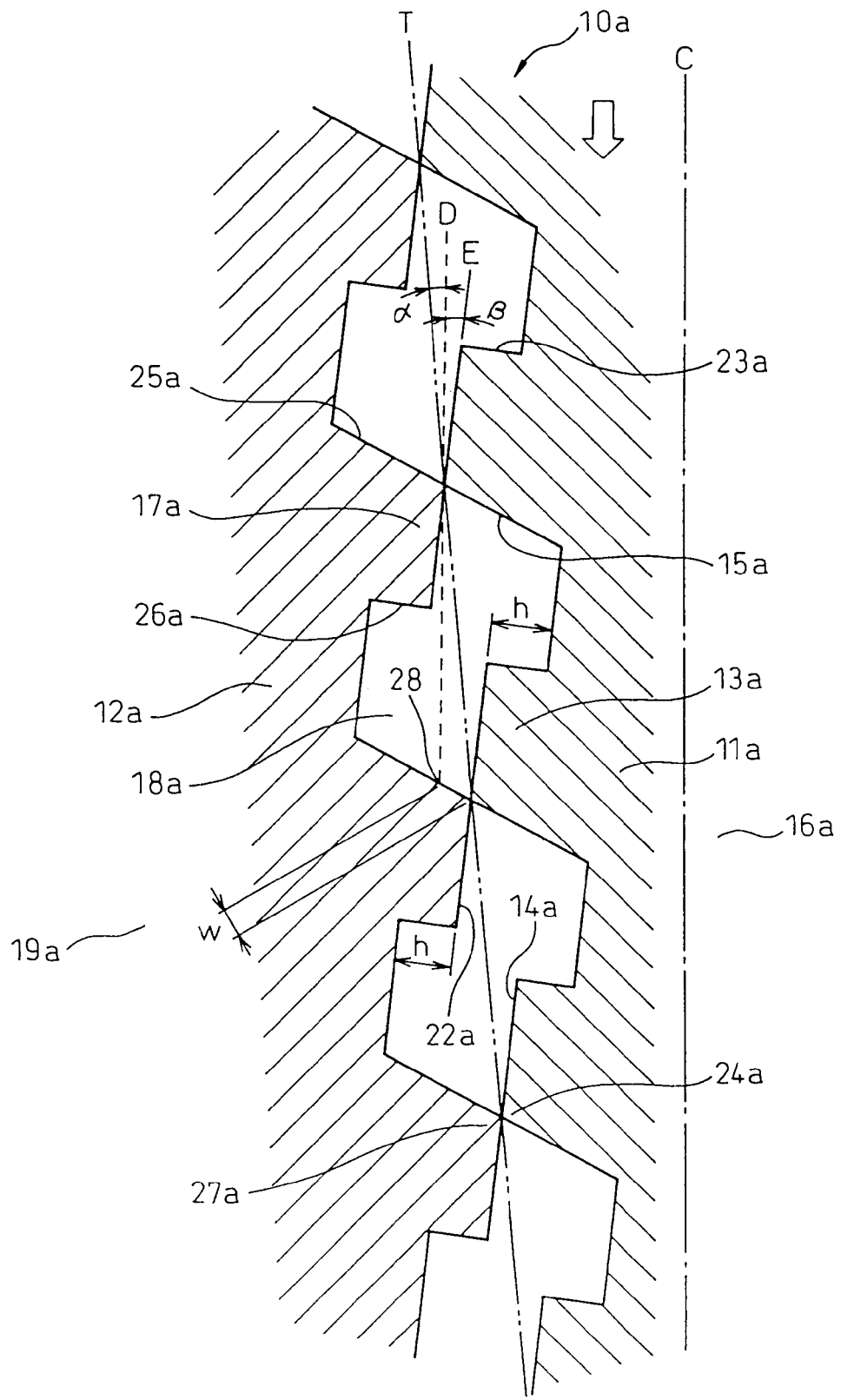
FIG. 3 is a cross-sectional view for explaining a state of an inserting position of a tapered screw joint which is an embodiment of the present invention.

The first elemental technique is shown in FIG. 3 and is described as follows. Top faces 14a, 22a of a male 13a and a female thread ridge 17a of a tapered male screw section 11a and a tapered female screw section 12a are arranged on tapered face E (shown by a solid line in FIG. 3) which is located a little in an opposite direction to a virtual tapered face T (shown by a two-dotted chain line in FIG. 3) of a male and a female thread row with respect to face D (shown by a broken line in FIG. 3) which is parallel to pipe axis C.

The second elemental technique is described as follows. When the height of a portion of the multiple-start thread ridges in one lead is made lower than that of other thread ridges, a probability of competition of the male thread ridges with the female thread ridges is reduced. Due to the foregoing, a portion in which the thread ridges are low is substantially assumed to be a bottom portion of a single-start screw thread. Accordingly, in the case of a double-start screw thread, the width of the bottom portion is three times as large as that of the width of the top face of the thread ridge of the tapered male screw section. Therefore, in the process of stabbing, the male thread ridges can be easily accommodated in the bottom portions of the tapered female screw section.

The third elemental technique is shown in FIGS. 1(A), 1(B), 1(C) and 2(A) and is described as follows. In the process of thread cutting, a coordinate $(r, Z_m)$ of the corner of the stabbing flank face 15 on the insertion side of the top face 14 of the male ridge 13 of the tapered male screw section 11 is previously determined so that positions of the thread ridges of the tapered male screw section 11 and the tapered female screw section 12 in the axial direction can be put into the third state at all times. A mark 31 is attached at a position in the circumferential direction of the pipe 16 through which the coordinate $(r, Z_m)$ passes. At the same time, as shown in FIGS. 1(A), 1(B), 1(C) and 2(B), a mark 21 is attached to an end in the circumferential direction of the end 20 of the tapered female screw section 12 of the pipe 19 (short pipe) so that the bottom portion 18 of the female screw ridge 17 with which the corner of the stabbing flank face 15 of the male screw ridge 13 starts engaging can be set at a position of the coordinate $(r, Z_f)$. In the process of insertion, positions of the tapered male screw section 11 and the tapered female screw section 12 in the circumferential direction are determined so that the marks 31, 21 can be put on each other, and then the pipe joint 10 is screwed.

It is obvious that the first and the third elemental technique can be applied irrespective of the number of threads. Concerning the number of threads, for example, the double-start screw thread is a screw thread which is screwed by two thread ridges when it is turned by one turn. However, in the case of a multiple-start screw thread, a different point of the multiple-start screw thread from the normal single-start screw thread is that the marks, the number of which is the same as the number of threads, exist at regular intervals in the circumferential direction. However, the concept of the third elemental technique can be applied to the multiple start screw thread as it is. Of course, this concept can be applied to a screw in which the tapered screw section is divided into two stages as shown FIG. 6(C). When this concept is combined with a concept of the stabbing guide (the U.S. Pat. No. 4,407,527), labor can be saved in a series of works from the stabbing of the tapered male screw section into the tapered female screw section to the screwing.

Successively, referring to the appended drawings, an embodiment of the present invention will be explained for understanding the present invention.

Figure 12:
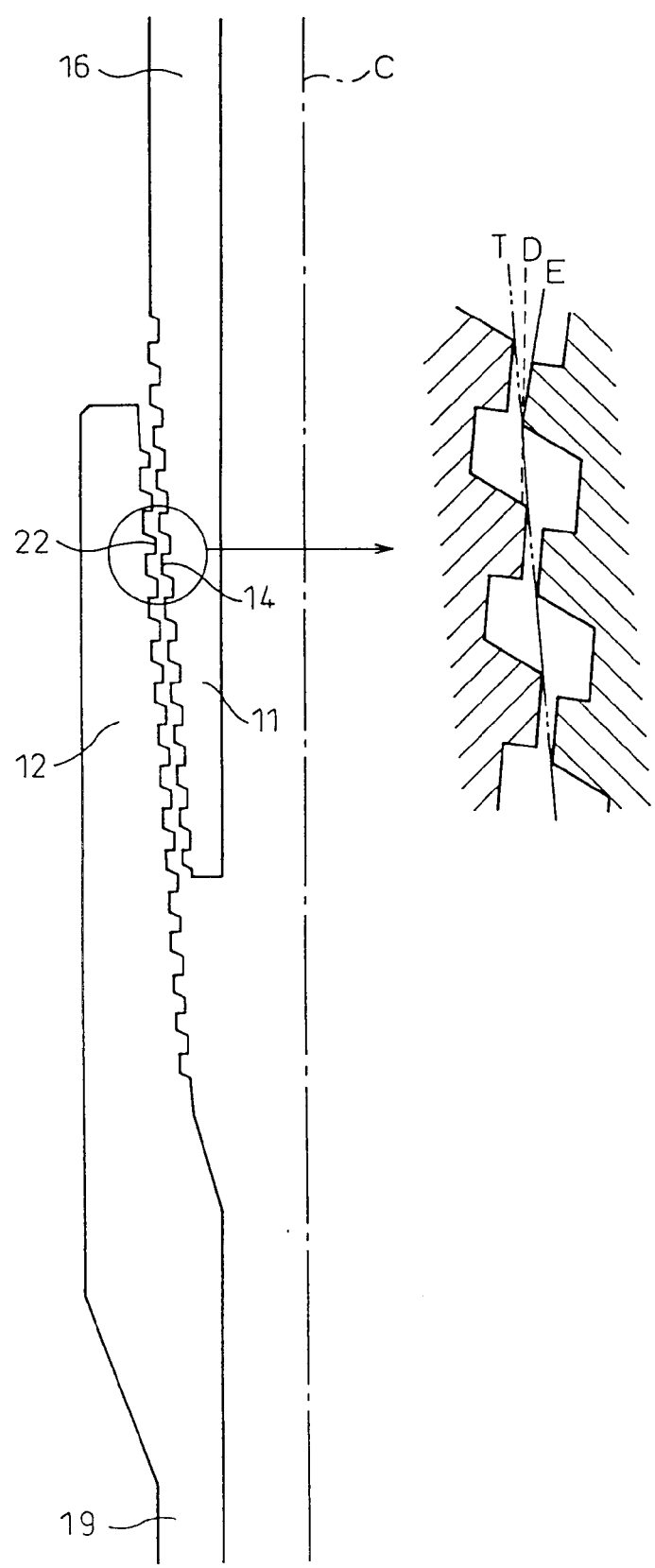
FIG. 12 is a cross-sectional view and a partially enlarged view for explaining a configuration of an integral type tapered screw joint to which the pipe joint is applied.

FIG. 12 is a view showing a pipe joint comprising: a pin having a tapered male screw section formed on an outer circumferential face of an end 11 of a pipe 16; and a box having a tapered female screw section, which can be screwed to the tapered male screw section, formed on an inner circumferential face of an end 12, the thickness of which is increased, of a pipe 19, wherein the tapered male screw section is screwed into the tapered female screw section, and a top face 14 of a male thread ridge of the buttress-shaped tapered male screw section and a top face 22 of a female thread ridge of the buttress-shaped tapered female screw section are inclined to face E in a direction opposite to tapered face T of screw threads with respect to face D which is parallel to pipe axis C.

Figure 13:
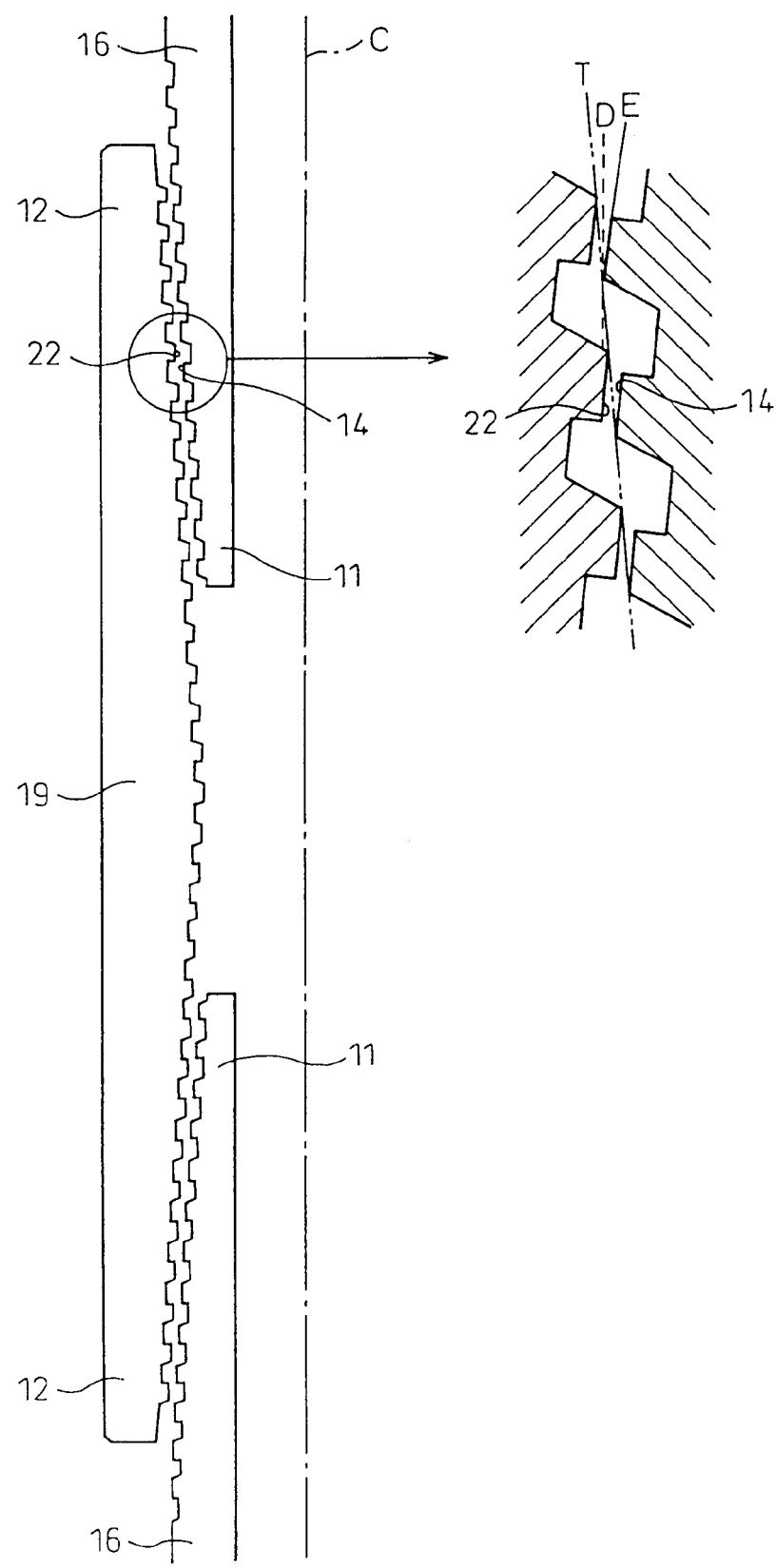
FIG. 13 is a cross-sectional view and a partially enlarged view for explaining a configuration of a coupling type tapered screw joint to which the pipe joint is applied.

FIG. 13 is a view showing a pipe joint comprising: a pin having a tapered male screw section formed on an outer circumferential face of an end 11 of a pipe 16; and a coupling having tapered female screw sections, which can be screwed to the tapered male screw section, formed on inner circumferential faces of both ends 12 of a short pipe 19, wherein the tapered male screw section is screwed into the tapered female screw section, and a top face 14 of a male thread ridge of the buttress-shaped tapered male screw section and a top 22 of a female thread ridge of the buttress-shaped tapered female screw section are inclined to face E in a direction opposite to tapered face T of screw threads with respect to face D which is parallel to the pipe axis C.

FIG. 3 is an enlarged view of the screw section shown in FIGS. 12 and 13.

FIG. 3 shows a state of insertion of the pipe joint 10a in which the corner 24a of the stabbing flank face 15a of the male thread ridge 13a of the tapered male screw section 11a and the top face 14a of the thread ridge comes into contact with the corner 27a of the stabbing flank face 25a of the female thread ridge 17a of the tapered female screw section 12a and the top face 22a of the thread ridge.

The tapered male screw section 11a and the tapered female screw section 12a come into contact with each other via a virtual tapered face (tapered face of a thread row) T shown by a two-dotted chain line in FIG. 3. At any position except for the position which is in the above positional relation, even when the tapered male screw section 11a is slid to any position on face T, the tapered male screw section 11a does not come into contact with the tapered female screw section 12a. That is, in the process of insertion, the tapered male screw section 11a passes on face T and surely lands at the stabbing flank face 25a of the tapered female screw section 12a.

In the positional relation shown in FIG. 3, when the corner 24a of the male thread ridge 13a of the tapered male screw section 11a passes through the corner 27a of the female thread ridge 17a of the tapered female screw section 12a, the corner 24a drops downward along face D, which is shown by a broken line, parallel to pipe axis C of the pipe joint 10a. Therefore, the corner 24a lands at a point 28 on the stabbing flank face 25a which is located downward. At this time, an overlap "w" of the male thread ridge 13a and the female thread ridge 17a becomes maximum. Therefore, the most stable screw engagement can be provided although it is difficult to pass through.

The reason why the stabbing flank face 15a of the male thread ridge 13a smoothly lands at the stabbing flank face 25a of the female thread ridge 17a is described as follows. As clearly can be seen in the drawing, there is formed a stabbing run-off angle β on the opposite side to the tapered angle α with respect to face D which is parallel to pipe axis C so that the top faces 14a of the thread ridges 13a having a predetermined width like a square screw thread, trapezoidal screw thread or buttress screw thread cannot stick with the top faces 22a of the female thread ridges 17a in the process of insertion. From an ideal viewpoint, even if these top faces 14a, 22a of the thread ridges are parallel to pipe axis C, no sticking is caused between the top faces. However, in the actual process of insertion of the tapered male screw 11a, there is caused a slight inclination, and further roundness and taper of the screw joint itself is not perfect. Accordingly, the male thread ridge 13a and the female thread ridges 17a actually compete with each other. When the stabbing run-off angle β is large, the tapered male screw can be easily screwed into the tapered female screw, however, when stabbing run-off angle β is too large, height "h" of the load flank faces 23a, 26a, which support a load given to the joint when the joint is drawn, is reduced. Therefore, the tapered male screw section 11a tends to come out from the tapered female screw section 12a. In order to prevent the above problems, it is not appropriate to increase the stabbing run-off angle β excessively. As a result of the experiment made by the present inventors, when this pipe joint is put into practical use, it is sufficient that the stabbing run-off angle β is 1° to 3° at least. In this connection, in FIG. 3, reference numeral 16a is a pipe, reference numeral 18a is a bottom portion, and reference numeral 19a is a pipe.

Figure 4:
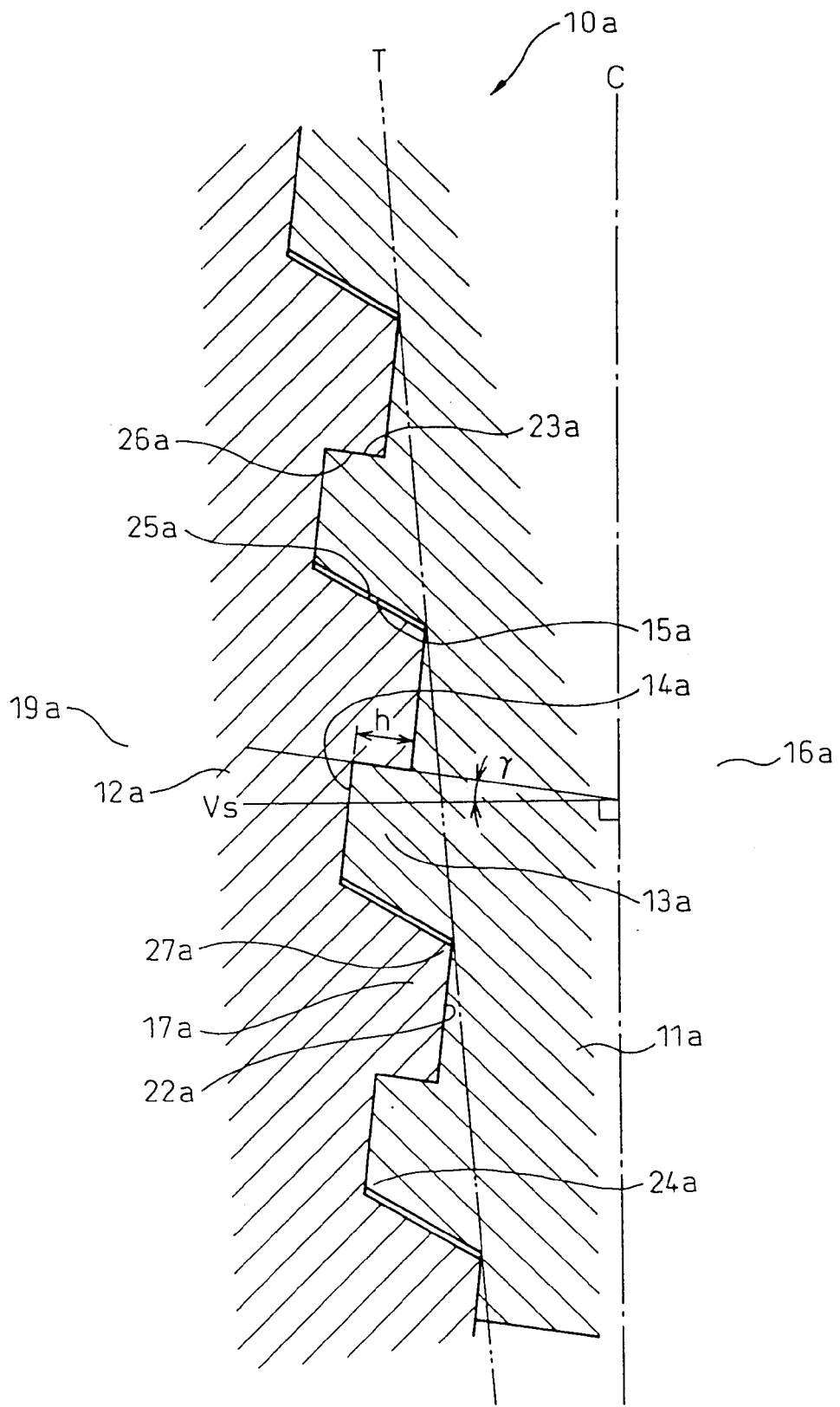
FIG. 4 is a cross-sectional view for explaining a state of engagement of a tapered screw joint which is an embodiment of the present invention.

FIG. 4 is a view showing a state in which the tapered male screw section 11a is tightened to the tapered female screw section 12a, that is, FIG. 4 is a view showing a state of the completion of engagement.

A profile of the tapered screw of the pipe joint 10a of this embodiment is characterized in that height "h" of the load flank faces 23a, 26a is lower than that of the stabbing flank faces 15a, 25a. Due to the foregoing, the tapered male screw section 11a might be drawn out as described before. In order to increase the resistance to prevent the tapered male screw section 11a from being drawn out, the following two methods are adopted.

First, as shown in FIG. 4, the load flank faces 23a, 26a are inclined by the angle γ with respect to face $V_S$ perpendicular to pipe axis C so that the tapered male screw section 11a cannot be drawn out.

Figure 14:
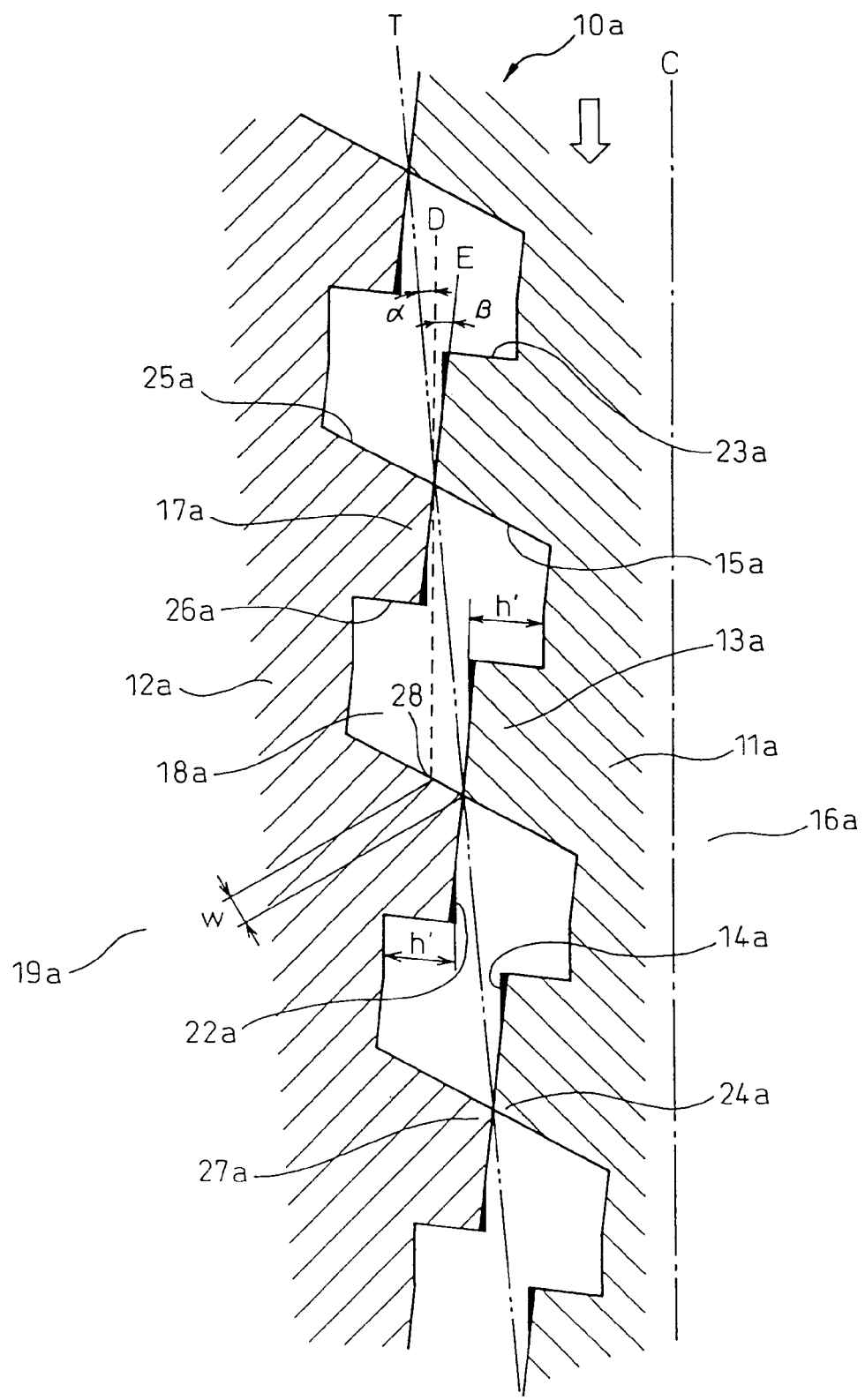
FIG. 14 is a cross-sectional view for explaining an inserting position of a tapered screw joint to which the pipe joint is applied.

Secondly, as shown in FIG. 14, angles of all top faces 14a, 22a of the female screw ridges 13a, 17a are not formed into the stabbing run-off angle β, but only angles on the side close to the stabbing flank faces 15a, 25a are made to be the stabbing angle β, and the rest which is close to the load flank faces 23a, 26a are made parallel to the pipe axis, so that the height of the thread ridges can be increased as shown by the black portions in the drawing. Alternatively, an angle of all face of one of the top faces 14a, 22a of the thread ridges is made to be the stabbing run-off angle β, or an angle of a portion of the face of one of the top faces 14a, 22a of the thread ridges is made to be the stabbing run-off angle β, and the rest are made parallel to the pipe axis. All face of the other of the top faces 14a, 22a of the thread ridges is made parallel to the pipe axis. Due to the foregoing, height "h" of the load flank faces 23a, 26a can be kept high.

In this connection, parallelism to pipe axis C includes not only a case in which pipe axis C is accurately parallel to the top faces of the thread ridges but also a case in which the top faces of the thread ridges are inclined with respect to pipe axis C in such a manner that no problems are caused in the process of stabbing (insertion). This could be said in the following explanations in this specification.

Figure 15:
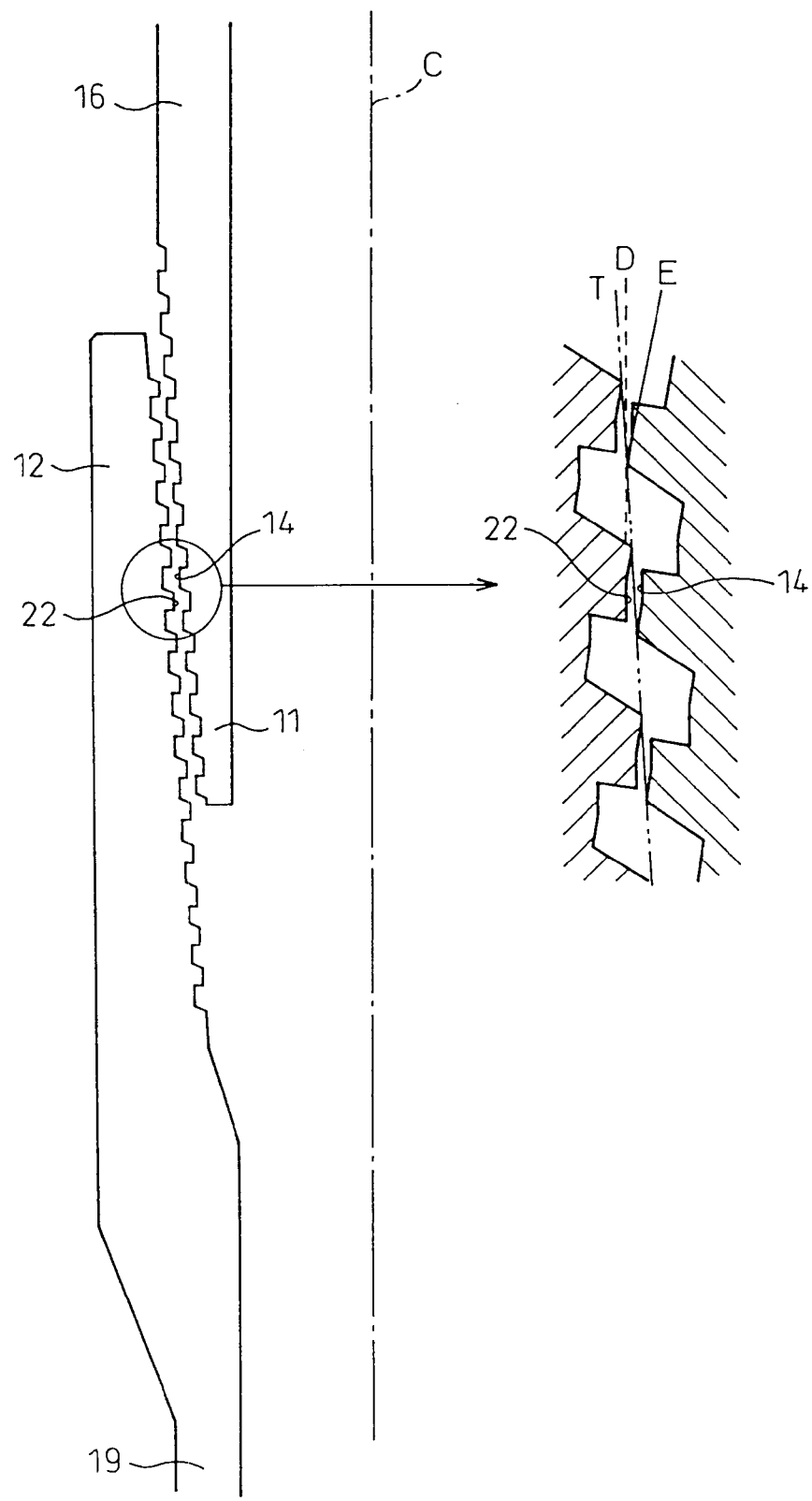
FIG. 15 is a cross-sectional view for explaining a configuration of an integral type tapered screw joint to which the pipe joint is applied.
Figure 16:
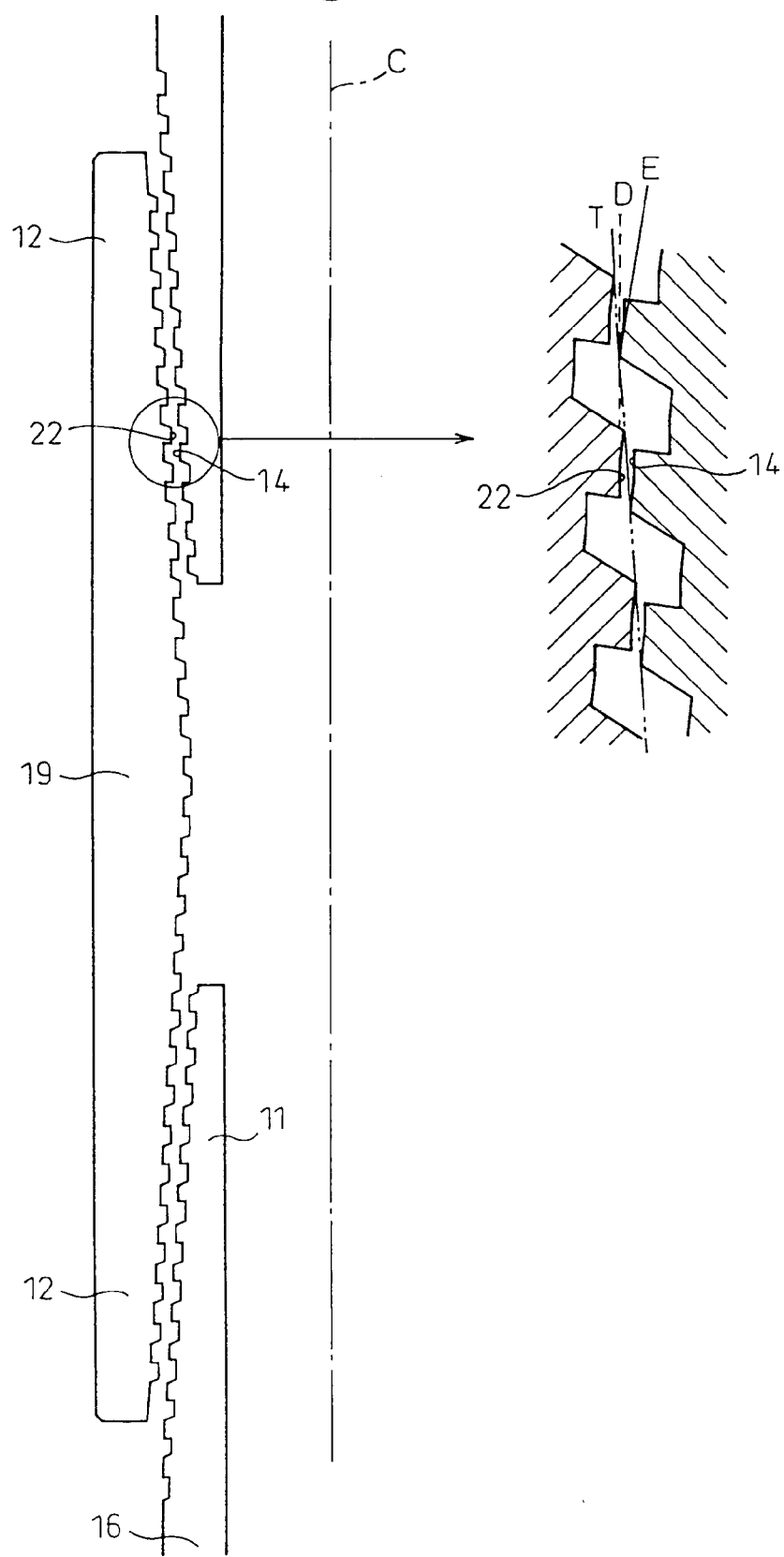
FIG. 16 is a cross-sectional view for explaining a configuration of a coupling type tapered screw joint to which the pipe joint is applied.

FIGS. 15 and 16 are views respectively showing an integral type and a coupling type pipe joint which are embodiments of the present invention. These embodiments are provided with the thread ridge, the configuration of which is shown in. FIG. 14.

Figure 1B:
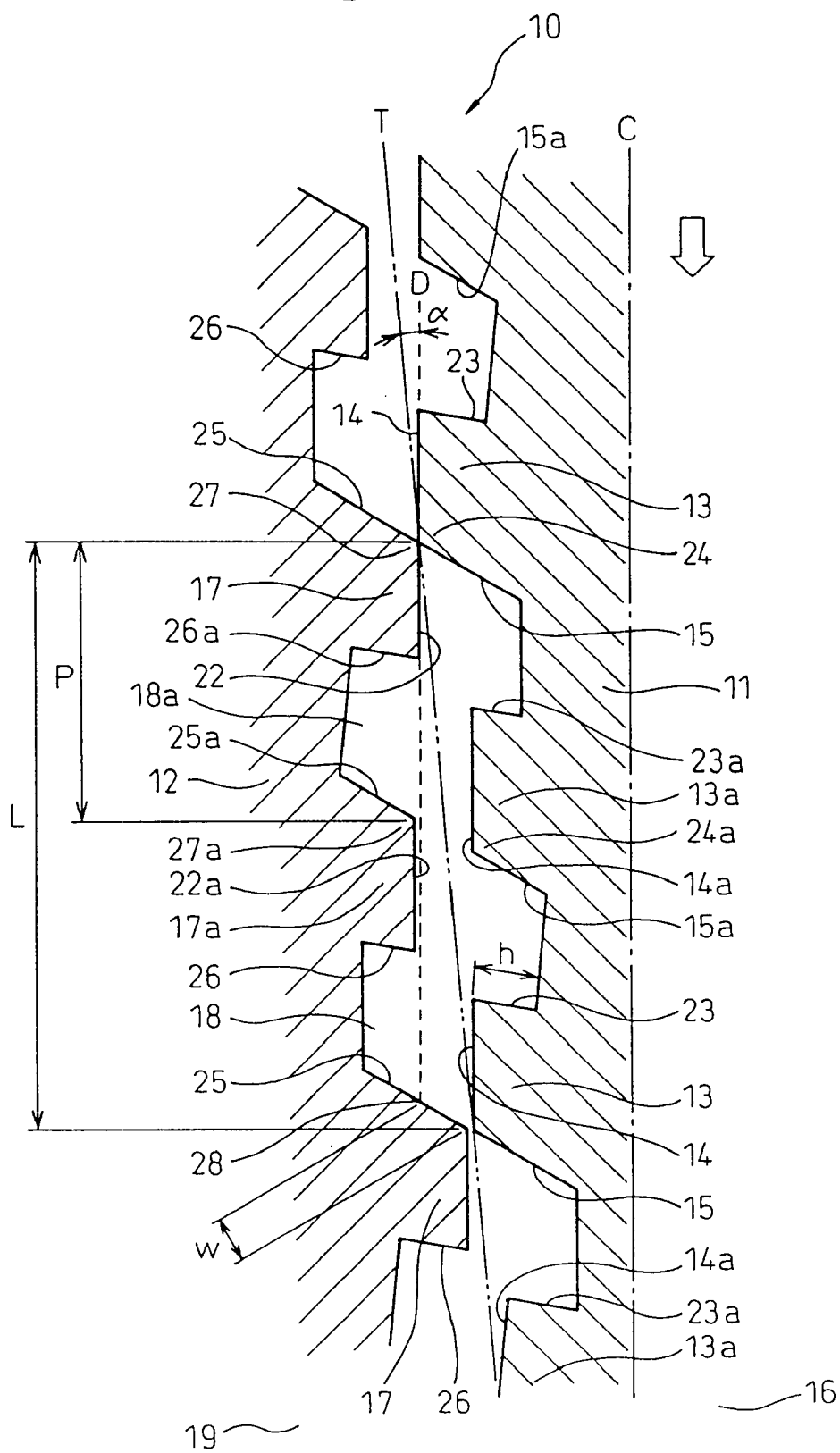
FIG. 1(B) is a cross-sectional view for explaining a positional state of insertion of a tapered screw joint of one embodiment of the present invention in which stabbing flank faces of the tapered screw joint are put upon each other at a maximum.

In FIG. 1(B), there are shown a tapered male screw section 11 and a tapered female screw section 12 which are double-start, screw threads, the lead of which is L and the pitch of which is p (L/2), in which heights of the thread ridges are changed for each ridge. FIG. 1(B) shows a state of insertion in which the corners 24, 27 of the respective top faces 14, 22 of the male thread ridges 13, 13a and the female thread ridges 17, 17a agree with each other on virtual tapered line T. In this connection, in the male thread ridge 13a and the female thread ridge 17a, each element of the male thread ridge 13 and the female thread ridge 17 is attached with a letter "a" in the drawing.

In the above state shown in FIG. 1(B), when the top face 14 of the male thread ridge 13 of the tapered male screw section 11 passes through the top face 22 of the female thread ridge 17 of the tapered female screw section 12, the corner 24 drops along face D, which is shown by a broken line, parallel to pipe axis C of the pipe joint 10. Then, the corner 24 passes through the female thread ridge 17a which is located under the female thread ridge 17. After that, the corner 24 lands at a point 28 on the stabbing flank face 25 of the female screw 17 located under the female thread ridge 17a. In other words, the male thread ridge 13a and the female thread ridge 17a, the heights of which are small, may be made low so that the male thread ridge 13a and the female thread ridge 17a cannot prevent the male thread ridge 13, the height of which is large, landing at the female thread ridge 17, the height of which is large. When the stabbing flank face 15 of the male thread ridge 13, the height of which is large, is successfully put on the stabbing flank face 25 of the female thread ridge 17, the height of which is large, overlap "w" of the male thread ridge 13 and the female thread ridge 17 becomes maximum. Due to the foregoing, overlap "w" in this case can be doubled compared with the above case of a single-start screw thread. Therefore, stability can be enhanced in the process of landing the stabbing flank corner.

The reason why the stabbing flank face 15 of the male thread ridge 13 can successfully land at the stabbing flank face 25 of the female thread ridge 17 is that the thread ridges, the heights of which are low, are alternately arranged as can be seen in FIG. 1(B).

In this connection, in FIG. 1(B), reference numeral 16 is a pipe, reference numeral 18 is a bottom portion, reference numeral 19 is a pipe, and reference numeral 26 is a load flank face of the female thread ridge 17.

Figure 17:
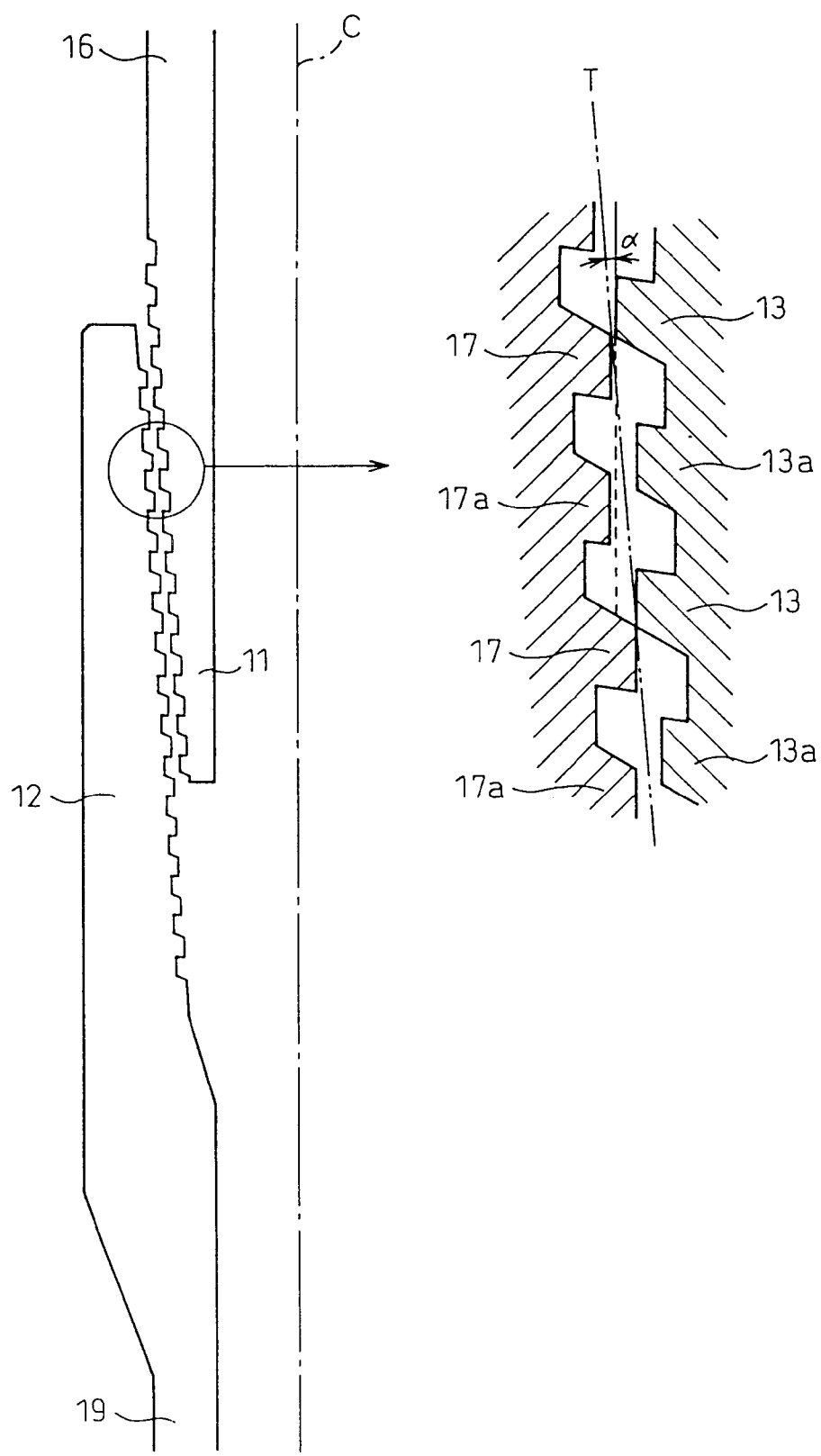
FIG. 17 is a cross-sectional view for explaining a configuration of an integral type tapered screw joint to which the pipe joint is applied.
Figure 18:
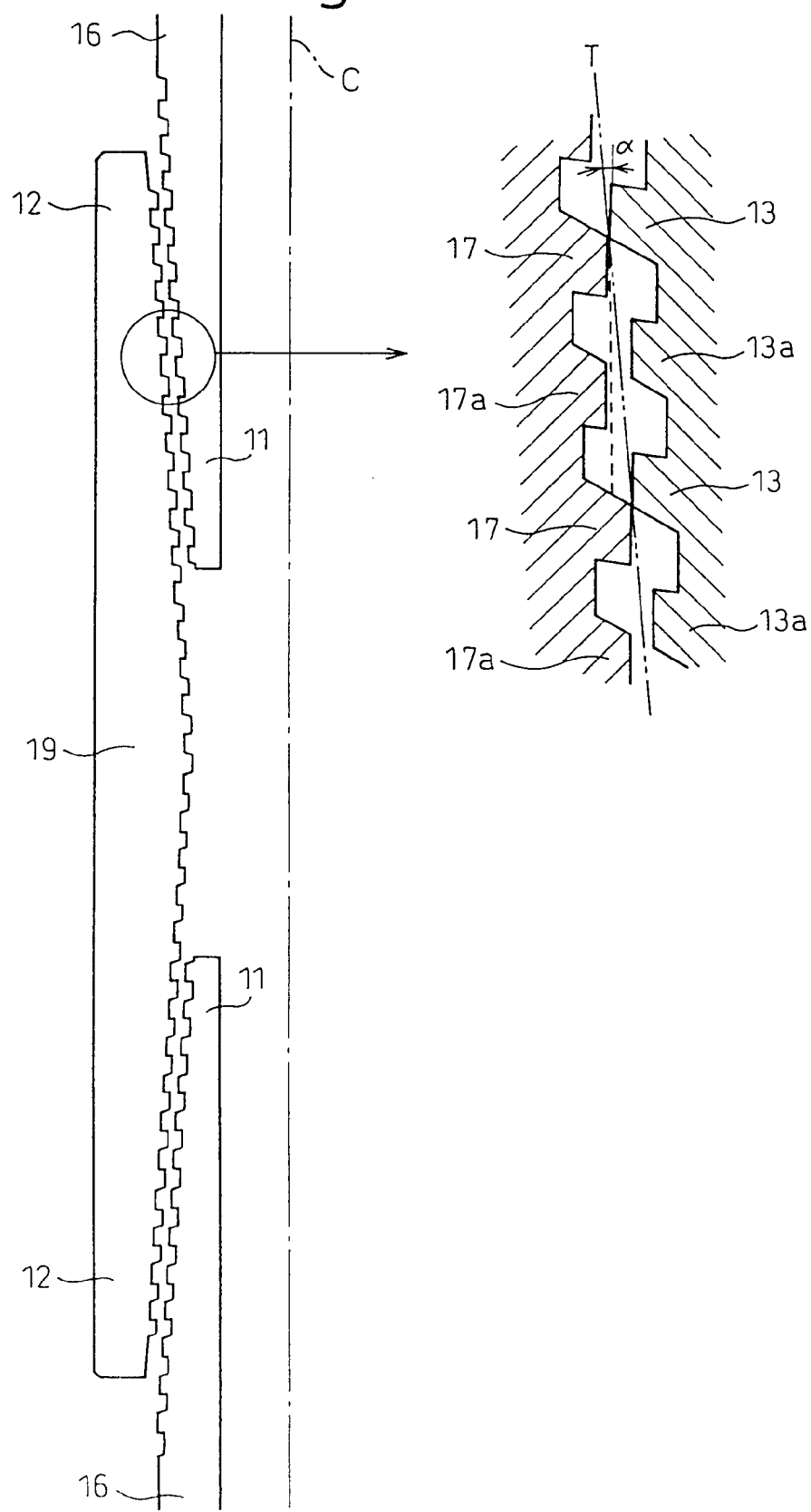
FIG. 18 is a cross-sectional view for explaining a configuration of a coupling type tapered screw joint to which the pipe joint is applied.

FIGS. 17 and 18 are views respectively showing an integral type and a coupling type pipe joint which are embodiments of the present invention. These embodiments are provided with the thread ridge, the configuration of which is shown in FIG. 1(B).

Figure 1C:
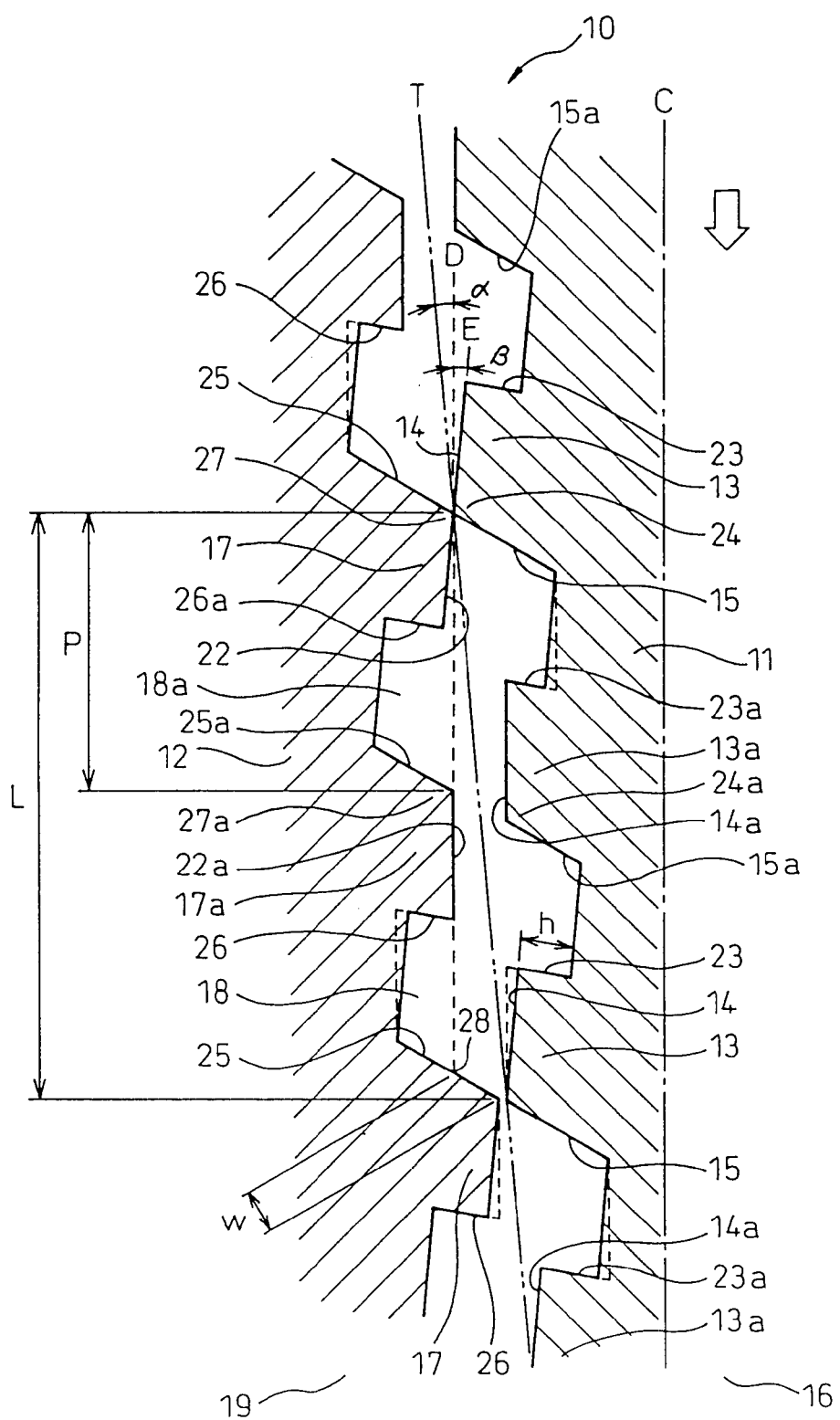
FIG. 1(C) is a cross-sectional view for explaining a positional state of insertion of a tapered screw joint of one embodiment of the present invention in which stabbing flank faces of the tapered screw joint are put upon each other at the maximum.
Figure 2A:
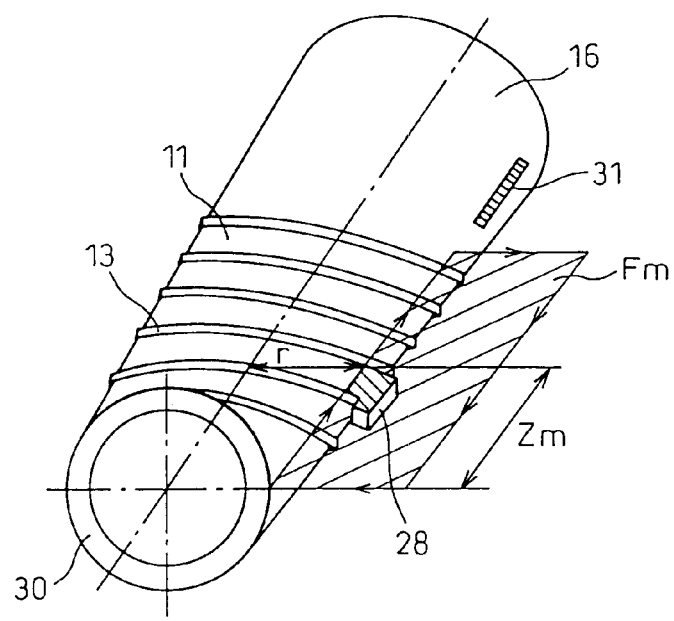
FIGS. 2(A) and 2(B) are perspective views for explaining positions of marks formed in the process of thread cutting in a pipe joint of an embodiment of the present invention.
Figure 2B:
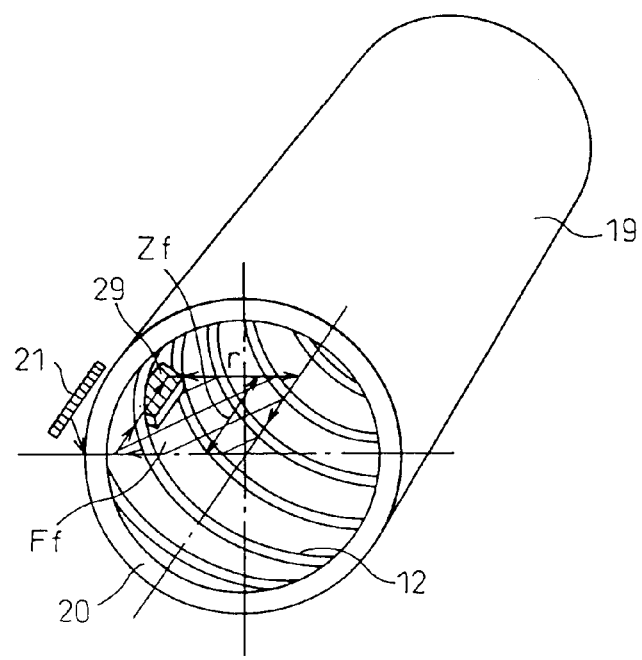

In FIG. 1(C), there are shown a tapered male screw section 11 and a tapered female screw section 12 which are double-start screw threads, the lead of which is L and the pitch of which is p (L/2), in which heights of the thread ridges are changed for each ridge. FIG. 1(C) shows a state of insertion in which the corner 24 of the stabbing flank face 15 and the top face 14 of the male thread ridge 13 comes into contact with the corner 27 of the stabbing flank face 25 and the top face 22 of the female thread ridge 17, under the condition that points on the respective top faces 14, 22 of the male thread ridges 13, 13a and the female thread ridges 17, 17a come into contact with virtual tapered face T. In this connection, in the male thread ridge 13a and the female thread ridge 17a, each element of the male thread ridge 13 and the female thread ridge 17 is attached with a letter "a" in the drawing.

In the above state shown in FIG. 1(C), when the corner 24 of the male thread ridge 13 of the tapered male screw section 11 passes through the corner 27 of the female thread ridge 17 of the tapered female screw section 12, the corner 24 drops along face D, which is shown by a broken line, parallel to pipe axis C of the pipe joint 10. Then, the corner 24 dodges through the female thread ridge 17a which is located under the female thread ridge 17. After that, the corner 24 lands at a point 28 on the stabbing flank face 25 of the female screw 17 located under the female thread ridge 17a. In other words, the male thread ridge 13a and the female thread ridge 17a, the heights of which are small, may be made low so that the male thread ridge 13a and the female thread ridge 17a cannot prevent the male thread ridge 13, the height of which is large, landing at the female thread ridge 17, the height of which is large. When the stabbing flank face 15 of the male thread ridge 13, the height of which is large, is successfully put on the stabbing flank face 25 of the female thread ridge 17, the height of which is large, overlap "w" of the male thread ridge 13 and the female thread ridge 17 becomes a maximum. Due to the foregoing, overlap "w" in this case can be doubled compared with the above case of a single-start screw thread. Therefore, stability can be enhanced in the process of landing of the stabbing flank corner.

The reason why the stabbing flank face 15 of the male thread ridge 13 can successfully land at the stabbing flank face 25 of the female thread ridge 17 is that the thread ridges, the heights of which are low, are alternately arranged as can be seen in FIG. 1(C). In addition to that, there is formed a stabbing run-off angle β on the opposite side to the tapered angle α with respect to face D which is parallel to pipe axis C so that the top faces 14 of the thread ridges 13 having a predetermined width like a square screw thread or trapezoidal screw thread cannot compete with the top faces 22 of the female thread ridges 17 in the process of insertion. From an ideal viewpoint, even if these top faces 14, 22 of the thread ridges are parallel to pipe axis C (complement line of a broken line shown in FIG. 1(C)), no competition is caused between the top faces. However, in the actual process of insertion of the tapered male screw 11, there is caused a slight inclination. Accordingly, the male thread ridge 13 and the female thread ridges 17 actually compete with each other. When the stabbing run-off angle β is large, the tapered male screw can be easily screwed into the tapered female screw, however, when stabbing run-off angle β is too large, height "h" of the load flank faces 23, 23a, which support a load given to the joint when the joint is drawn, is reduced. Therefore, the tapered male screw section 11 tends to come out from the tapered female screw section 12. In order to prevent the above problems, it is not appropriate to increase the stabbing run-off angle β excessively. Since heights of the male thread ridges 13, 13a and female thread ridges 17, 17a are reduced, when the inclination angles of the top faces 14, 22 of the thread ridges are determined, it is necessary to ensure a necessary height of the thread. In this connection, in FIG. 1(C), reference numeral 16 is a pipe, reference numeral 18 is a bottom portion, reference numeral 19 is a pipe, and reference numeral 26 is a load flank face of the female thread ridge 17.

Figure 19:
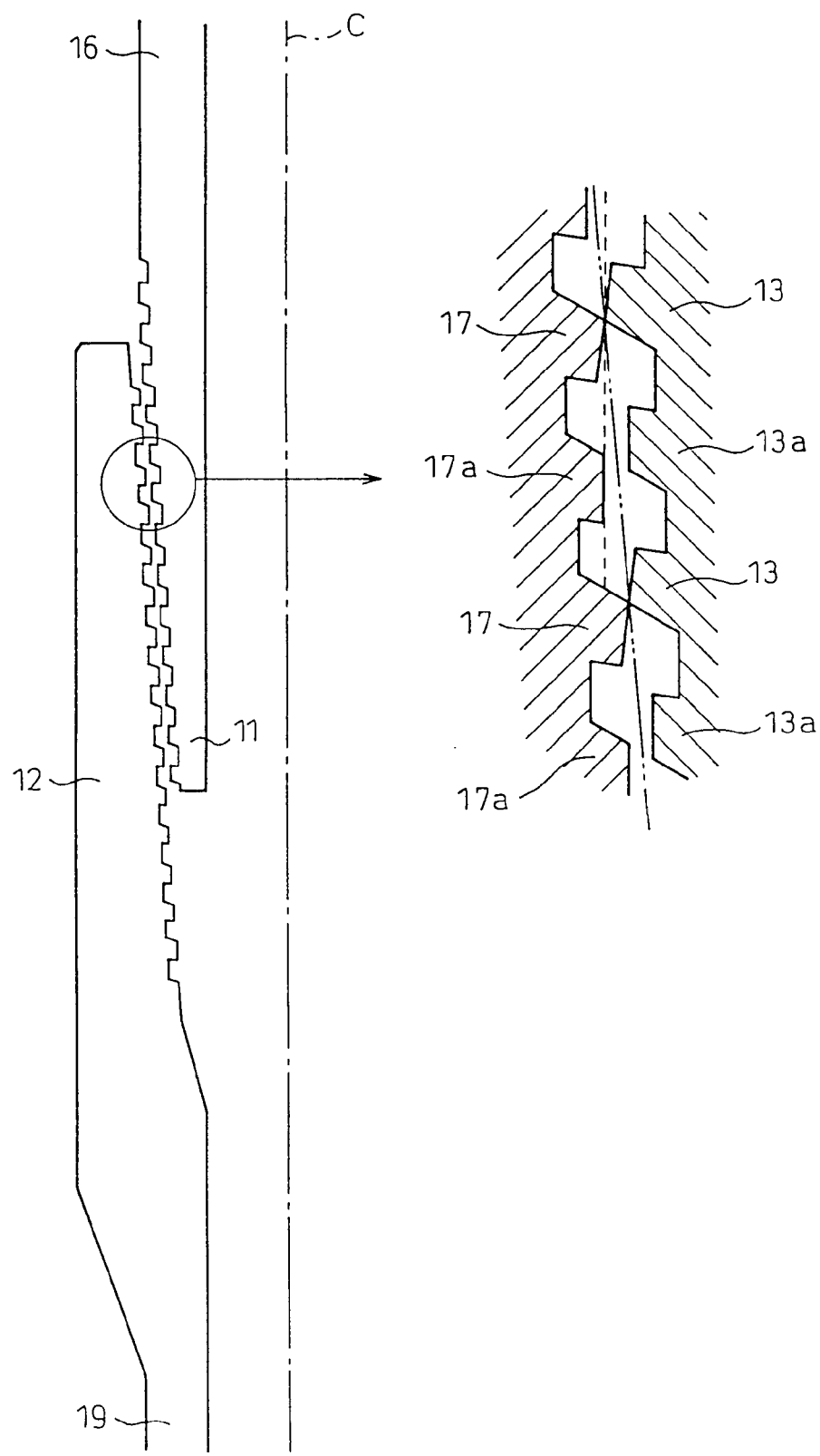
FIG. 19 is a cross-sectional view for explaining a configuration of an integral type tapered screw joint to which the pipe joint is applied.
Figure 20:
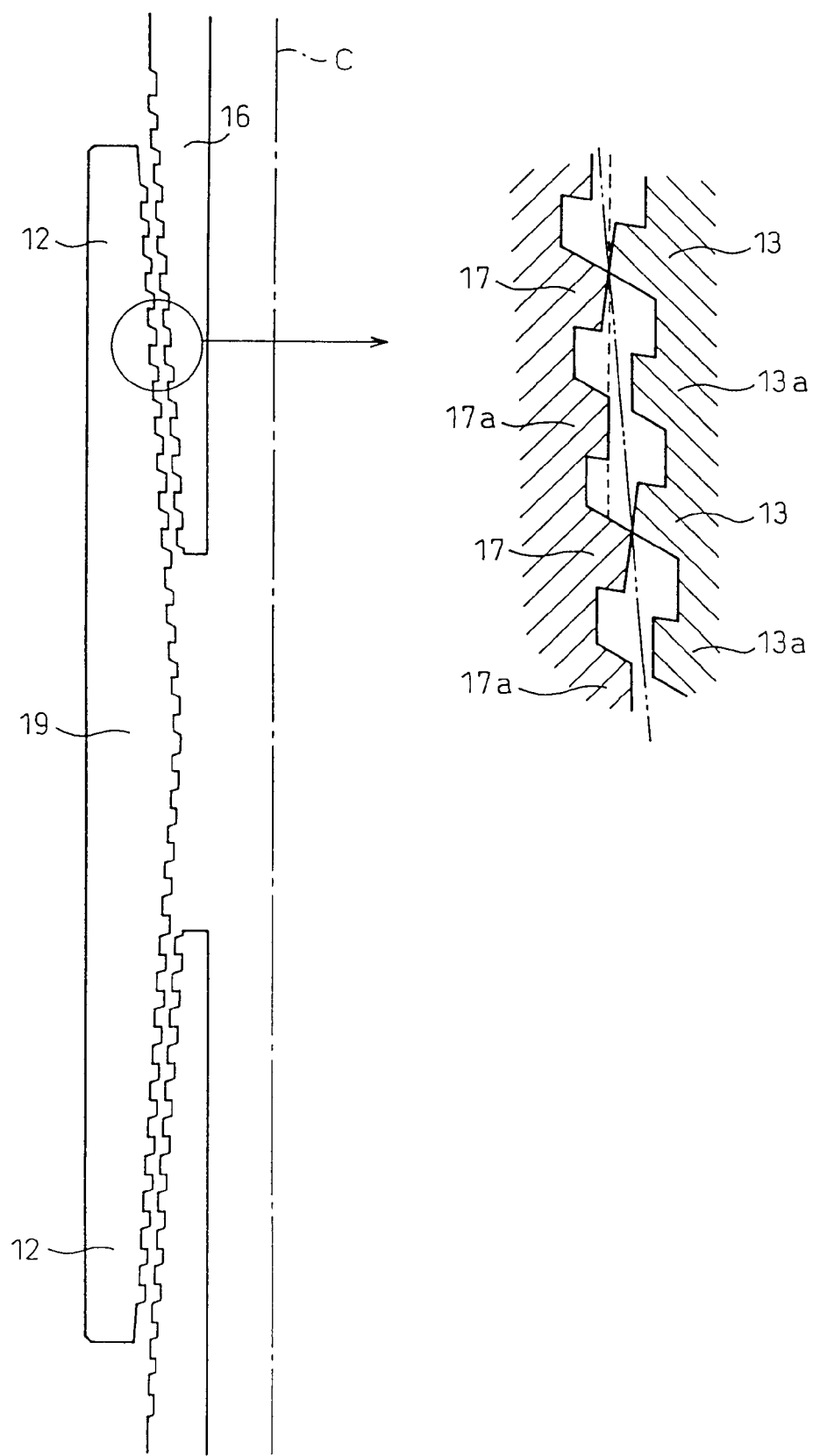
FIG. 20 is a cross-sectional view for explaining a configuration of a coupling type tapered screw joint to which the pipe joint is applied.

FIGS. 19 and 20 are views respectively showing an integral type and a coupling type pipe joint which are embodiments of the present invention. These embodiments are provided with the thread ridge, the configuration of which is shown in FIG. 1(C).

Figure 5A:
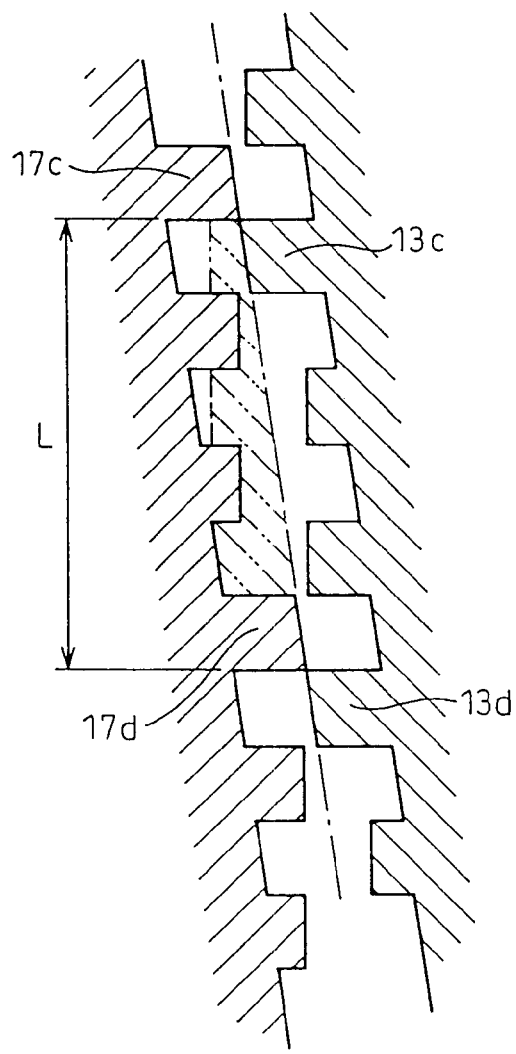
FIGS. 5(A) and 5(B) are cross-sectional views showing a configuration of a tapered triple-start screw thread to which the pipe joint of the invention is applied.

Embodiments in the case of a double-start screw thread are explained above in detail. A tightening rate is increased when the number of threads is increased. Therefore, concerning a triple-start screw thread and a fourfold-start screw, how to determine the height of the thread ridge will be explained below. FIG. 5(A) is a view showing an arrangement of a triple-start screw thread in which high thread ridges are arranged at every third place, that is, high thread ridges are arranged every thread ridges, the number of which is (number of thread ridges—1).

After the male thread ridge 13c has passed through the female thread ridge 17c, the male thread ridge 13c can go into a landing point of the female thread ridge 17d. In this embodiment, an overlapping area in which the stabbing flank faces overlap on each other can be extended, and the male thread ridge can stably land at the female thread ridge 17d in a large area of lead L. However, when an engaging state is assumed as illustrated by a two-dotted chain line, an engaging height is reduced as shown in the drawing, which is a problem of this embodiment. In this connection, reference numeral 13d in FIG. 5(A) is a high male thread ridge.

Figure 5B:
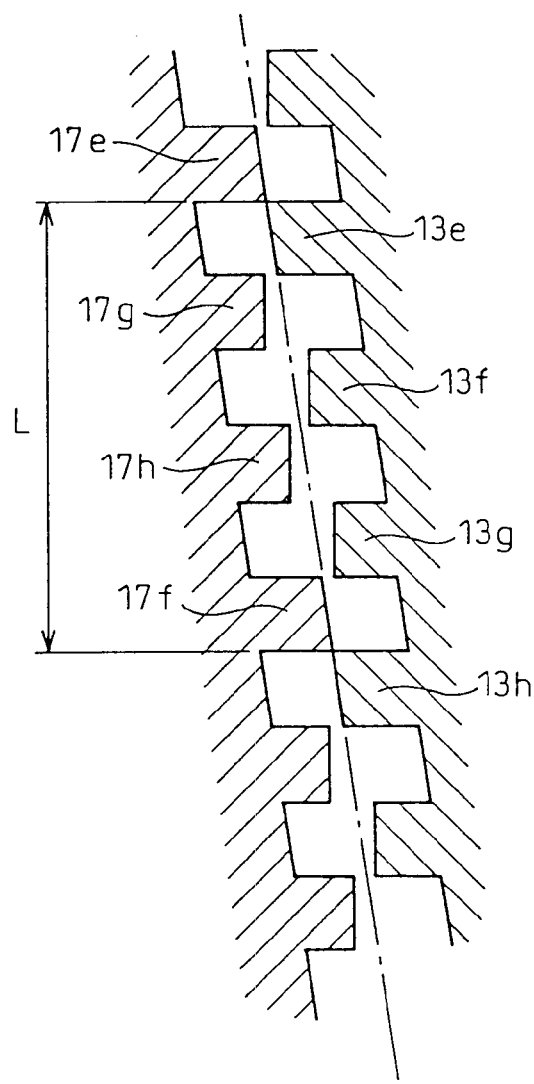

In order to solve the above problems, there is provided an embodiment shown in FIG. 5(B) in which the stabbing position and the landing width are sacrificed and the heights of the female thread ridges 17g, 17h in the middle of the high female thread ridges 17e, 17f are increased. The male thread ridges 13e, 13f can respectively land at the female thread ridges 17h, 17f. In this connection, reference numerals 13g, 13h shown in FIG. 5(B) are also male thread ridges.

Figure 7A:
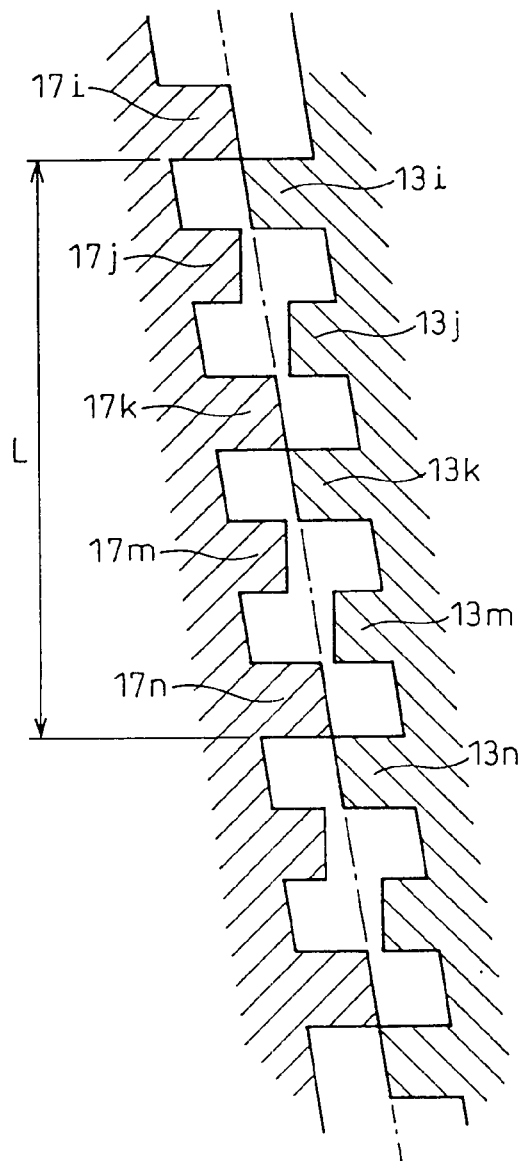
FIGS. 7(A) and 7(B) are cross-sectional views showing a configuration of a tapered fourfold-start screw thread to which the pipe joint of the invention is applied.

FIG. 7(A) is a view showing a fourfold-start screw thread. In this embodiment, high thread ridges are alternately arranged. According to this embodiment, the stabbing property, which is the working property from the process of insertion to the process of screwing, and the engagement state are the same as those of a double-start screw thread, and the rate of screwing can be doubled compared with that of the double-start screw thread. The male thread ridges 13i, 13k can respectively land at the female thread ridges 17k, 17n.

Figure 7B:
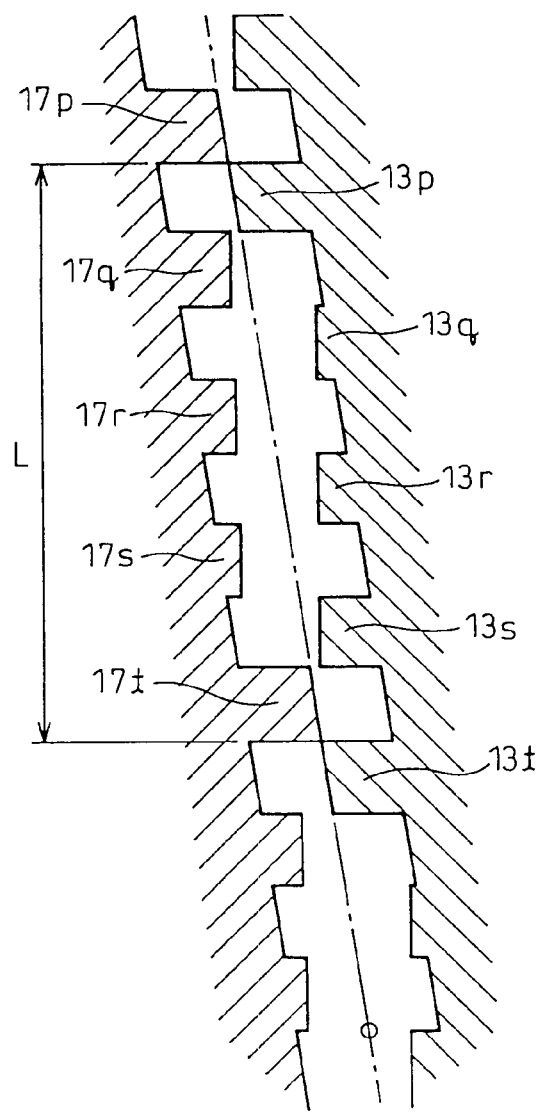

FIG. 7(B) is a view showing an arrangement of a fourfold screw thread in which high thread ridges are arranged at every fourth place, that is, high thread ridges are arranged every thread ridges, the number of which is (number of thread ridges—1). After the male thread ridge 13p has passed through the female thread ridge 17p, the male thread ridge 13p can see through into a landing point of the female thread ridge 17t. In the same manner as that of the embodiment shown in FIG. 5(A), the stabbing property of this embodiment is excellent, however, the joint efficiency is sacrificed. As long as a positional relation between the male thread ridges and the female thread ridges can be controlled in the process of thread cutting, since the stabbing property is sufficiently high even in the cases shown in FIGS. 5(B) and 7(A), when consideration is given to the joint efficiency, the embodiments shown in FIGS. 5(B) and 7(A) are more appropriate than the embodiments shown in FIGS. 5(A) and 7(B) in which the high and low thread ridges are arranged.

Even if the number of threads is increased as described above, in order to make the male thread ridges smoothly pass through in the process of stabbing, an inclination reverse to the tapered face of the thread row may be formed on the top faces of the high thread ridges. This concept is the same as that of a double-start screw thread.

As described before, concerning the structure shown in FIG. 10(A), even in the case of a conventional buttress joint according to API, when the inserting position is appropriately selected, it is possible to tighten the joint immediately after the completion of insertion. The essential point is described as follows. When the tapered male screw thread 61 is perpendicularly dropped from any position shown in FIG. 10(A) to a position at which corner R of the stabbing flank face 71 of the male thread ridge 63 comes into contact with corner R of the stabbing flank face 72 of the tapered female screw section 62, the stabbing flank face 71 of the male screw thread can be put on the stabbing flank face 72 of the female screw thread. Therefore, the tapered male screw thread 62 can be fitted in the tapered female screw thread 62.

Figure 10A:
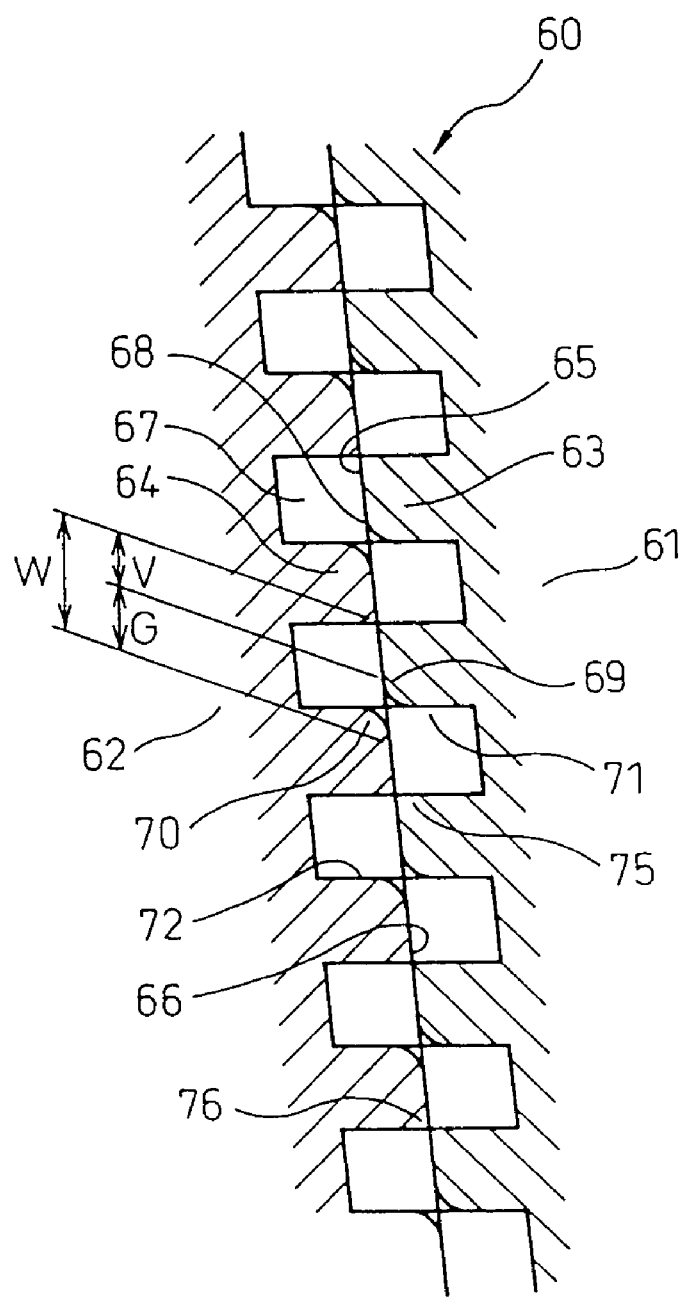
FIGS. 10(A) and 10(B) are cross-sectional views for explaining a configuration of a buttress screw joint of API and a starting state of screwing of a pipe joint in which the buttress screw joint of API is used.
Figure 10B:
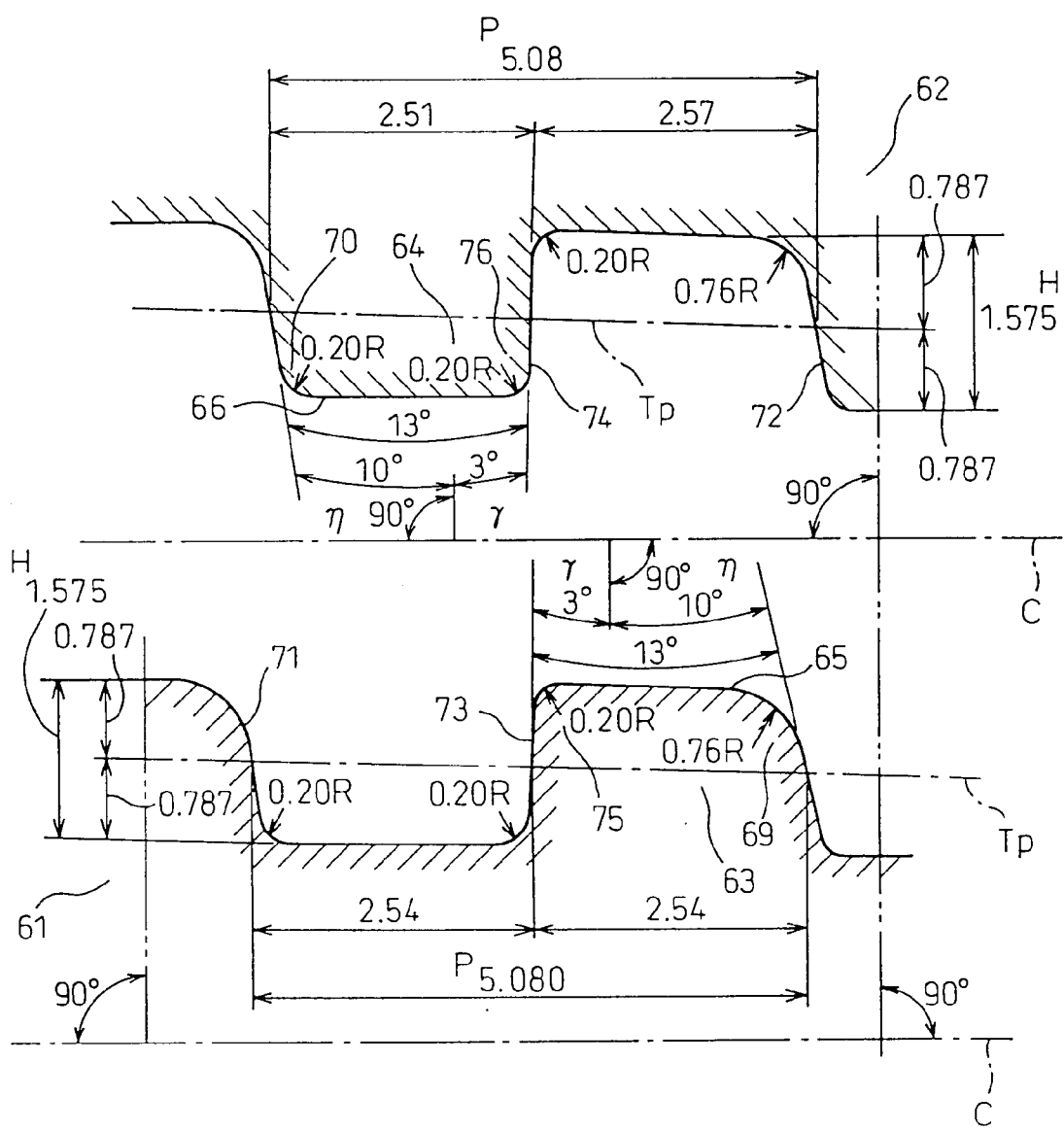

The most important thing is how to provide a positional relation between the male and the female screw shown in FIG. 10(A).

In the present invention, marks are attached onto outer surfaces of the pin and the coupling (or box) at the center of engagement when thread cutting is conducted corresponding to the male and the female thread row. When the marks are put together in the process of insertion, the pin and the box can be necessarily set at the most appropriate positions.

As shown in FIGS. 1(A), 1(B) and 1(C), mark O at the center of virtual tapered face T is considered to be a reference position of the male threading tool 28 and the female threading tool 29. As respectively shown in FIGS. 2(A) and 2(B), a positional relation between the male threading tool 28 and the pipe 16 is set in the male threading pass so that it can pass through (r, $Z_m$), and a positional relation between the female threading tool 29 and the pipe 19 is set in the female threading pass so that it can pass through (r, $Z_f$). At that time, mark 31 is put at a position in the circumferential direction on the pipe 16 surface at which threading tool moving face $F_m$ crosses the pipe 16, and also mark 21 is put at a position in the circumferential direction on the pipe 19 surface at which threading tool moving face $F_f$ crosses the pipe 19. The tapered male screw section 11, to which the mark 31 is attached, is inserted into the tapered female screw section 12, to which the mark 21 is attached, so that the position of the mark 31 can agree with the position of the mark 21 in the circumferential direction. Due to the foregoing, the positional relations between the male thread row and the female thread row shown in FIGS. 1(A), 1(B) and 1(C) can be necessarily reproduced. In other words, without the competition of the top face 14 of the male thread ridge 13 with the top face 22 of the female thread ridge 17, the stabbing flank face 15 of the male thread ridge 13 can be surely put on the stabbing flank face 25 of the female thread ridge 17. Therefore, the male screw section 11 can be smoothly inserted into the female screw section, and screwing can be smoothly carried out after that. In this connection, in FIGS. 1(A), 1(B) and 1(C), reference numerals 23, 26 are load flank faces, and reference numeral 30 is a forward end of the tapered male screw section 11.

Figure 6C:
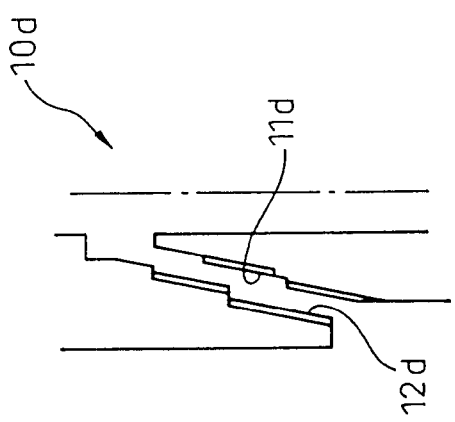
FIGS. 6(A), 6(B) and 6(C) are cross-sectional views for explaining a configuration of a tapered screw joint to which the pipe joint of the invention is applied.
Figure 6B:
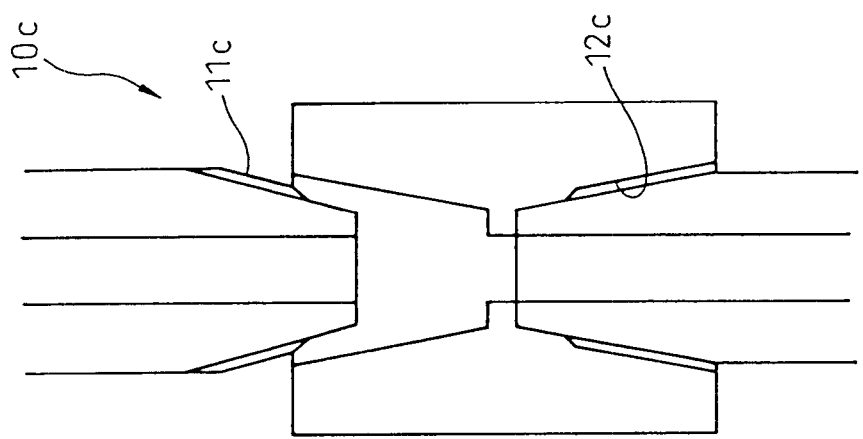
Figure 6A:
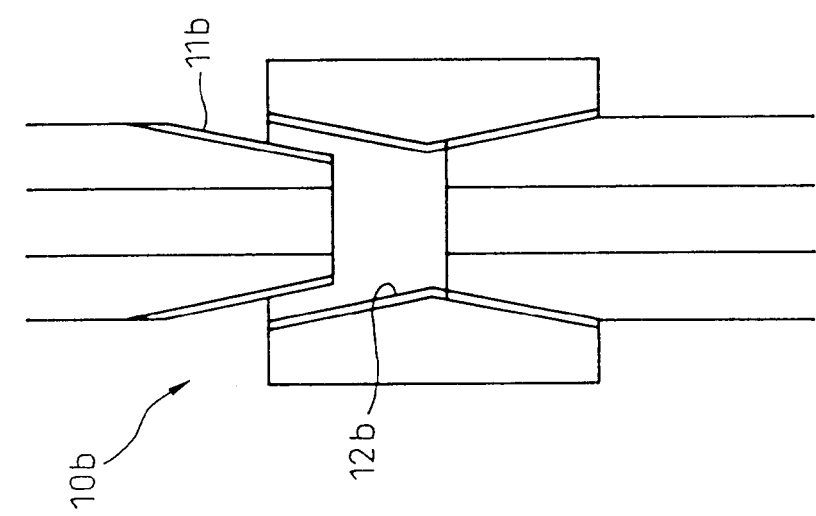

It should be noted that the present invention is not limited to the above specific embodiment. It is possible to apply the present invention to the pipe joint configurations shown in FIGS. 6(A), 6(B) and 6(C). In FIG. 6(A), there is shown a pipe joint 10b having only a tightening screw. In FIG. 6(B), there is shown a pipe joint 10c having a metallic sealing section at the end of the screw engaging section. In FIG. 6(C), there is shown a pipe joint 10d in which a uniformly tapered section shown in FIG. 6(A) or 6(B) is divided into two stages. In this connection, reference numerals 11b to 11d shown in FIGS. 5(A), 5(B), 5(C) are the tapered male screw sections, and reference numerals 12b to 12d are the tapered female screw sections.

EXAMPLE

Figure 8A:
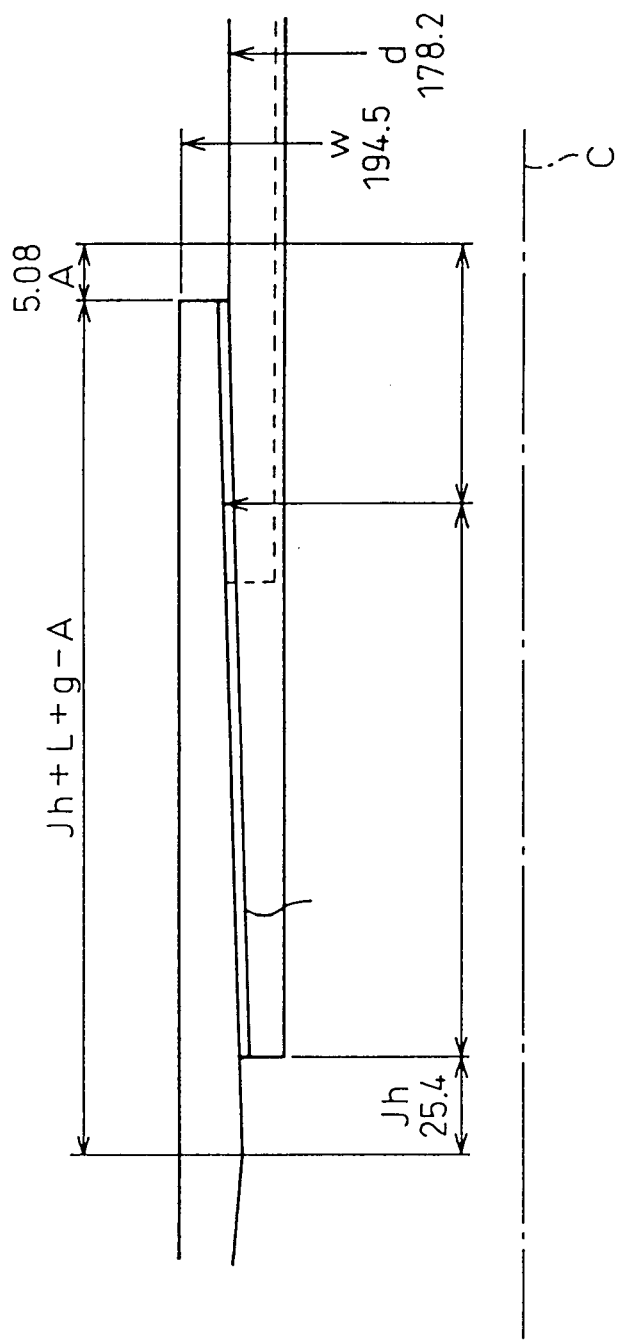
Figure 9A:
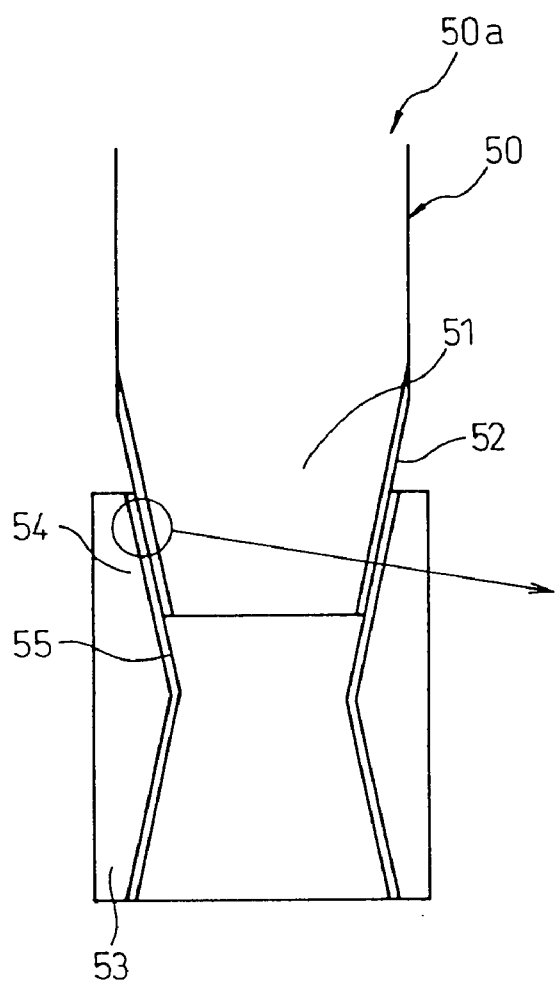
FIG. 9(A) is a cross-sectional view for explaining a starting state of a pipe joint having a conventional square thread for pipe use.
Figure 9B:
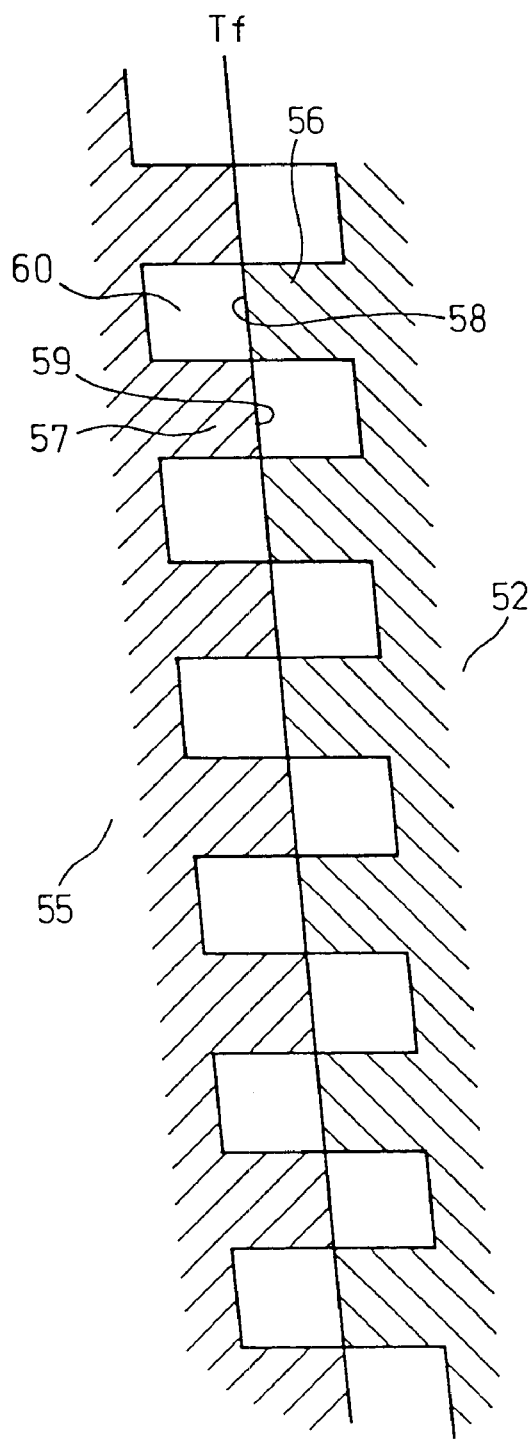
FIG. 9(B) is a partially enlarged view of FIG. 9(A).

Referring to FIGS. 8(A), 8(B), 8(C), an example of the pipe joint according to the above embodiment will be explained. A prototype of the pipe joints shown in FIGS. 8(A), 8(B), 8(C) is a buttress pipe joint of API, the diameter of which is 7 inches, in which the stabbing property is improved according to the pipe joint of the embodiments described above. In this connection, FIG. 8(A) is a cross-sectional view of the pipe joint, which is in an engagement state, showing a dimensional relation.

Different points of this pipe joint from those of the buttress pipe joint of API are described as follows. The respective top faces of the male and female thread ridges of the pin and the box are inclined by 3° with respect to pipe axis C onto the opposite side to the thread row tapered faces PT and BT, and further the load flank faces are inclined by 3° with respect to the faces perpendicular to pipe axis C onto the opposite direction to that of the buttress joint of API.

For the purpose of designating the relative positions of the male and the female thread ridge of the pin and the box in the process of stabbing, as shown in FIG. 8(C), in the tapered male screw section, the male threading tool 28 is positioned so that the coordinate (r, $Z_m$) can agree with point P shown in the drawing. In this case, r=175.057 mm, and a distance from the end 30 of the male screw section is $Z_m$=5.9 mm, and P is an intersection point of the top face of the male thread ridge and the stabbing flank face, that is R-machining is not conducted in this case. Then, mark 31 is attached to a position in the circumferential direction at which point P crosses the thread row tapered face (one dotted chain line PT). These circumstances are shown in FIGS. 1(A), 1(B), 1(C), 2(A) and 2(B). In the same manner, as shown in FIG. 8(B), in the tapered female screw section, the female threading tool 29 is positioned so that the coordinate (r, $Z_f$) can agree with point B shown in the drawing. In this case, r=175.057 mm, and a distance from the end 20 of the female screw section is $Z_f$=45.31 mm, and B is an intersection point of the top face of the female thread ridge and the stabbing flank face, that is R-machining is not conducted in this case. Then, mark 21 is attached to a position in the circumferential direction at which point B crosses the thread tapered face (two dotted chain line BT). These circumstances are shown in FIGS. 1(A), 1(B), 1(C), 2(A) and 2(B).

In the above manner, threading and marking were conducted, and the tapered male screw section was perpendicularly inserted into the tapered female screw section so that the positions of the marks 31, 21 could agree with each other. Then, screwing was conducted to check whether or not the tapered male screw section was inserted into the tapered female screw section as it was. As a result of the test, the following were confirmed. When the tapered male screw section was carefully inserted into the tapered female screw section in such a manner that pipe axis C was not inclined, it was possible to screw the tapered male screw section into the tapered female screw section not only at the marking position but also at any position in the angle of 360°.

In the test, a phenomenon was observed, in which the tapered male screw section dropped down by one pitch after the insertion only at one position in the circumferential direction although no problems were caused by this phenomenon in the practical use. Concerning the relative positional relation between the pin and the box at this position, the marks 31 and 21 were located being opposed to each other by the angle of 180°. It is estimated that the pin and the coupling were located at the positions shown in FIG. 3.

FIGS. 11(A) and 11(B) are views showing a case in which the above sizes of engagement shown in FIG. 8(A) are not changed and only the screw configuration is changed from a single-start screw thread to a double-start screw thread in which high and low thread ridges are arranged. Also, in this case, the following were confirmed, In the same manner as that described above, it was possible to screw the tapered male screw section into the tapered female screw section even if the tapered male screw section was inserted at any position in the angle of 360°.

In this example, for example, from the viewpoint of preventing the occurrence of seizing, a corner section in which the thread ridge crest crosses the stabbing flank face may be chamfered.

INDUSTRIAL APPLICABLE FIELD

As described above, according to the pipe joints described the specification of the present invention, a top face of a male thread ridge of the tapered male screw section and a top face of a female thread ridge of the tapered female screw section have a predetermined width like a square screw thread, trapezoidal screw thread and buttress screw thread, and top faces of both thread ridges are inclined in a direction opposite to a tapered face of screw threads with respect to a face parallel to the pipe axis. Therefore, even if the tapered male screw section is inserted into the tapered female screw section at any position in the angle of 360°, the insertion and the successive screwing can be continuously carried out.

According to the pipe joints described in the specification of the present invention, a top face of a male thread ridge of the tapered male screw section and a top face of a female thread ridge of the tapered female screw section have a predetermined width like a square screw thread, trapezoidal screw thread and buttress screw thread, portions of top faces of both thread ridges are inclined in a direction opposite to a tapered face of screw threads with respect to a face parallel to the pipe axis, and the rest of top faces of both thread ridges are made parallel to the pipe axis. Therefore, it is possible to maintain the height of the load flank face. Accordingly, it is possible to form a screw joint configuration which is seldom drawn out.

Further, according to the pipe joint described in the specification of the present invention, a multiple-start screw thread is applied, in the case of an odd screw thread, a row of threads is composed of high male and female thread ridges, which are arranged every thread ridges, the number of which is (number of thread ridges—1), and also composed of low male and female thread ridges arranged between the high male and female thread ridges, in the case of an even screw thread, a row of screw threads is composed of high male and female thread ridges and low male and female thread ridges which are alternately arranged, or a row of threads is composed of high male and female thread ridges, which are arranged every thread ridges, the number of which is (number of thread ridges—1), and also composed of low male and female thread ridges arranged between the high male and female thread ridges. When a multiple-start thread ridge configuration in one thread lead is devised, the tapered male screw section can be screwed at the inserting position as it is, and further screwing can be easily and quickly carried out.

According to the pipe joint described in the specification of the present invention, a top face of a male thread ridge of the male screw section and a top face of a female thread ridge of the female screw section have a predetermined width like a square screw thread and trapezoidal screw thread, and top faces of both thread ridges are inclined in a direction opposite to a tapered face of screw threads with respect to a face parallel to the pipe axis. Therefore, even if the tapered male screw section is inserted into the tapered female screw section at any position in the angle of 360°, the insertion and the successive screwing can be continuously and smoothly carried out.

According to the pipe joint described in the specification of the present invention, marks to make the tapered male screw section agree with the tapered female screw section in the circumferential direction are attached in the process of thread cutting so that an original positional relation between the male thread row and the female thread row can be reproduced in which the stabbing flank face of the male thread ridge is set on the stabbing flank face of the female thread ridge without the occurrence of competition between the top face of the thread ridge of the male screw section and the top face of the thread ridge of the female screw section when the tapered male screw section is lowered in a perpendicular direction under the condition that a virtual tapered face coming into contact with the top face of the thread ridge of the tapered male screw section and a virtual tapered face coming into contact with the top face of the thread ridge of the tapered female screw section compete with each other when the tapered male screw section is inserted into the tapered female screw section. Therefore, the insertion of the tapered male screw section and the successive screwing can be continuously and smoothly carried out.

What is claimed is:

1. A pipe joint comprising: a pin having a tapered male screw section formed on an outer circumferential face of an end of a pipe; a box having a tapered female screw section, which can be screwed to the tapered male screw section, formed on an inner circumferential face of an end of a pipe, wherein marks to make the tapered male screw section agree with the tapered female screw section in the circumferential direction are attached in the process of thread cutting so that an original positional relation between the male thread row and the female thread row can be reproduced in which the stabbing flank face of the male thread ridge is set on the stabbing flank face of the female thread ridge without the occurrence of competition between the top face of the thread ridge of the male screw section and the top face of the thread ridge of the female screw section when the tapered male screw section is lowered in a perpendicular direction under the condition that a virtual tapered face coming into contact with the top face of the thread ridge of the tapered male screw section and a virtual tapered face coming into contact with the top face of the thread.

2. A pipe joint comprising: a pin having a tapered male screw section formed on an outer circumferential face of an end of a pipe; a coupling having tapered female screw sections, which can be screwed to the tapered male screw section, formed on inner circumferential faces of both ends of a short pipe, wherein marks to make the tapered male screw section agree with the tapered female screw section in the circumferential direction are attached in the process of thread cutting so that an original positional relation between the male thread row and the female thread row can be reproduced in which the stabbing flank face of the male thread ridge is set on the stabbing flank face of the female thread ridge without the occurrence of competition between the top face of the thread ridge of the male screw section and the top face of the thread ridge of the female screw section when the tapered male screw section is lowered in a perpendicular direction under the condition that a virtual tapered face coming into contact with the top face of the thread ridge of the tapered male screw section and a virtual tapered face coming into contact with the top face of the thread ridge of the tapered female screw section, agree with each other when the tapered male screw section is inserted into the tapered female screw section.

3. A pipe joint comprising: a pin having a tapered male screw section formed on an outer circumferential face of an end of a pipe; a box having a tapered female screw section, which can be screwed to the tapered male screw section, formed on an inner circumferential face of an end of a pipe, wherein the tapered male screw section is screwed into the tapered female screw section, a top face of a male thread ridge of the tapered male screw section and a top face of a female thread ridge of the tapered female screw section have a predetermined width, portions of top faces of both thread ridges are inclined in a direction opposite to a tapered face of screw threads with respect to a face parallel to the pipe axis, and the rest of top faces of both thread ridges are made parallel to the pipe axis.

4. A pipe joint comprising: a pin having a tapered male screw section formed on an outer circumferential face of an end of a pipe; a coupling having tapered female screw sections, which can be screwed to the tapered male screw section, formed on inner circumferential faces of both ends of a short pipe, wherein the tapered male screw section is screwed into the tapered female screw section, a top face of a male thread ridge of the tapered male screw section and a top face of a female thread ridge of the tapered female screw section have a predetermined width, portions of top faces of both thread ridges are inclined in a direction opposite to a tapered face of screw threads with respect to a face parallel to the pipe axis, and the rest of top faces of both thread ridges are made parallel to the pipe axis.

5. A pipe joint comprising: a pin having a tapered male screw section formed on an outer circumferential face of an end of a pipe; a box having a tapered female screw section, which can be screwed to the tapered male screw section, formed on an inner circumferential face of an end of a pipe, wherein a multiple-start screw thread is applied, in the case of an odd screw thread, a row of threads is composed of high male and female thread ridges, which are arranged for every thread ridge, the number of which is one less than the number of thread ridges, and also composed of low male and female thread ridges arranged between the high male and female thread ridges, in the case of an even screw thread, a row of screw threads is composed of high male and female thread ridges and low male and female thread ridges which are alternately arranged, or a row of threads is composed of high male and female thread ridges, which are arranged every thread ridges, the number of which is one less than the number of thread ridges, and also composed of low male and female thread ridges arranged between the high male and female thread ridges.

6. A pipe joint according to claim 5, wherein a top face of a male thread ridge of the male screw section and a top face of a female thread ridge of the female screw section have a predetermined width, and top faces of both thread ridges are inclined in a direction opposite to a tapered face of screw threads with respect to a face parallel to the pip axis.

7. A pipe joint comprising: a pin having a tapered male screw section formed on an outer circumferential face of an end of a pipe; a coupling having tapered female screw sections, which can be screwed to the tapered male screw section, formed on inner circumferential faces of both ends of a short pipe, wherein a multiple-start screw thread is applied, in the case of an odd screw thread, a row of threads is composed of high male and female thread ridges, which are arranged every thread ridges, the number of which is one less than the number of thread ridges, and also composed of low male and female thread ridges arranged between the high male and female thread ridges, in the case of an even screw thread, a row of screw threads is composed of high male and female thread ridges and low male and female thread ridges which are alternately arranged, or a row of threads is composed of high male and female thread ridges, which are arranged every thread ridges, the number of which is one less than the number of thread ridges, and also composed of low male and female thread ridges arranged between the high male and female thread ridges.

8. A pipe joint according to claim 7, wherein a top face of a male thread ridge of the male screw section and a top face of a female thread ridge of the female screw section have a predetermined width, and top faces of both thread ridges are inclined in a direction opposite to a tapered face of screw threads with respect to a face parallel to the pipe axis.

* * * * *

UNITED STATES PATENT AND TRADEMARK OFFICE
CERTIFICATE OF CORRECTION

PATENT NO. : 6,705,648 B1
DATED : March 16, 2004
INVENTOR(S) : Maruyama et al.

It is certified that error appears in the above-identified patent and that said Letters Patent is hereby corrected as shown below:

Column 18,
Line 5, after "thread" insert -- ridge of the tapered female screw section, agree with each other when the tapered male screw section is inserted into the tapered female screw section. --.

Column 19,
Line 15, change "pip" to -- pipe --.

Signed and Sealed this

Fifteenth Day of November, 2005

JON W. DUDAS
*Director of the United States Patent and Trademark Office*